(12) United States Patent
Ishihara et al.

(10) Patent No.: US 12,280,719 B2
(45) Date of Patent: Apr. 22, 2025

(54) BLIND SPOT DISPLAY DEVICE

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventors: Kazuyuki Ishihara, Nisshin (JP); Hiroshi Ando, Nisshin (JP)

(73) Assignees: DENSO CORPORATION, Kariya (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 393 days.

(21) Appl. No.: 17/962,573

(22) Filed: Oct. 10, 2022

(65) Prior Publication Data
US 2023/0128607 A1 Apr. 27, 2023

(30) Foreign Application Priority Data
Oct. 22, 2021 (JP) .................................. 2021-173042

(51) Int. Cl.
*B60R 1/10* (2006.01)
*B60R 1/08* (2006.01)

(52) U.S. Cl.
CPC ............... *B60R 1/10* (2013.01); *B60R 1/081* (2013.01)

(58) Field of Classification Search
CPC .............. B60R 1/08; B60R 1/081; B60R 1/10
USPC ........................................ 359/851, 861, 862
See application file for complete search history.

(56) References Cited

U.S. PATENT DOCUMENTS

| 4,989,964 A * | 2/1991 | Meise ..................... B60R 1/001 359/850 |
| 5,719,649 A * | 2/1998 | Shono .................. G02B 6/0036 362/617 |
| 5,731,900 A * | 3/1998 | Milner ...................... B60R 1/10 359/627 |
| 12,153,241 B2 * | 11/2024 | Ando ..................... G02B 23/08 |
| 2010/0277803 A1 * | 11/2010 | Pockett .................. G03B 21/62 353/121 |
| 2016/0318448 A1 * | 11/2016 | Haruyama ................ B60R 1/04 |
| 2017/0113617 A1 * | 4/2017 | Obata ....................... B60R 1/10 |
| 2017/0210295 A1 * | 7/2017 | Haruyama ................ B60R 1/08 |

(Continued)

FOREIGN PATENT DOCUMENTS

JP 2015-143087 A 8/2015

OTHER PUBLICATIONS

U.S. Appl. No. 17/877,249, filed Jul. 29, 2022, Ando et al.

*Primary Examiner* — Ricky D Shafer
(74) *Attorney, Agent, or Firm* — Posz Law Group, PLC

(57) ABSTRACT

A blind spot display device displays an image of blind spot blocked by an obstacle, and includes an incidence surface, a light guide member, a first reflecting surface closed to a display region, a second reflecting surface close to the blind spot, and multiple prism portions protruding toward the display region. An external environment light beam enters the incidence surface, reflects alternately on the first and second reflecting surface while passing through the light guide member, and emits toward the display region through the prism portions. Apexes of the prism portions are arranged in a three dimensional manner not along a plane.

10 Claims, 13 Drawing Sheets

(56) References Cited

U.S. PATENT DOCUMENTS

| | | | |
|---|---|---|---|
| 2023/0118387 A1* | 4/2023 | Tsuji | G02B 5/045 359/601 |
| 2023/0280539 A1* | 9/2023 | Tsuji | G02B 6/34 385/36 |
| 2023/0341605 A1* | 10/2023 | Ando | G02B 6/0053 |

* cited by examiner

BLIND SPOT DISPLAY DEVICE

CROSS REFERENCE TO RELATED APPLICATION

The present application claims the benefit of priority from Japanese Patent Application No. 2021-173042 filed on Oct. 22, 2021. The entire disclosure of the above application is incorporated herein by reference.

TECHNICAL FIELD

The present disclosure relates to a blind spot display device.

BACKGROUND

There has been known a blind spot display device, which is attached to an obstacle and displays an image of a blind spot area blocked by the obstacle.

SUMMARY

A blind spot display device, which displays an image of blind spot blocked by an obstacle, includes an incidence surface, a light guide member, a first reflecting surface closed to a display region, a second reflecting surface close to the blind spot, and multiple prism portions protruding toward the display region. An external environment light beam enters the incidence surface, reflects alternately on the first and second reflecting surface while passing through the light guide member, and emits toward the display region through the prism portions. Apexes of the prism portions are arranged in a three dimensional manner not along a plane.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Figure 1:
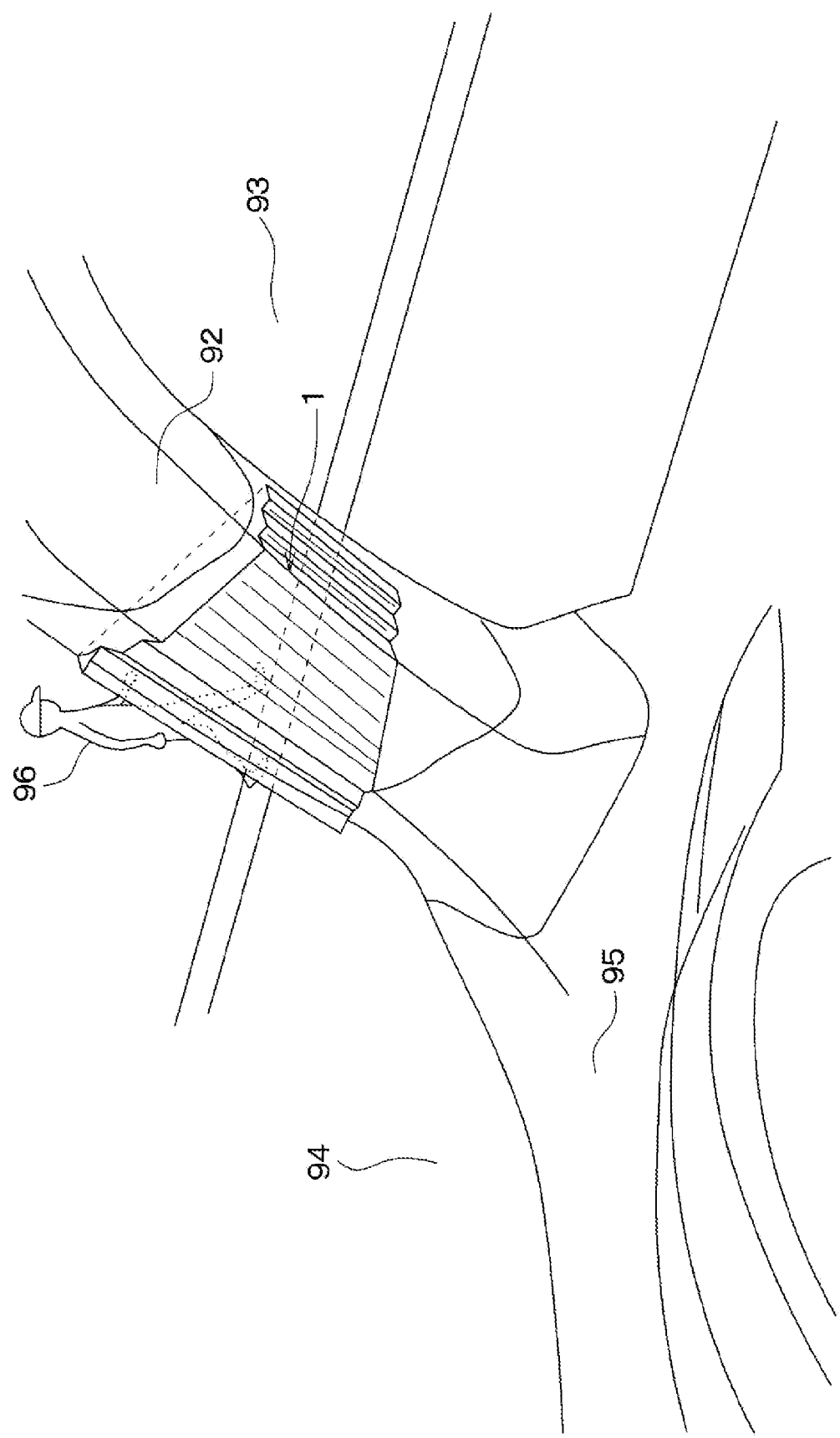
FIG. 1 is a diagram showing a view in a direction toward a front pillar of a vehicle with a drivers seat as an eye point according to a first embodiment.

Before describing a blind spot display device according to the present disclosure, a known blind spot display device will be described. For example, a known blind spot display device displays an image of a blind spot area blocked by an obstacle. The blind spot display device includes a translucent planar mirror and a planar mirror, which are attached to an obstacle and face one another. The blind spot display device further includes a translucent member arranged between the translucent planar mirror and the planar mirror, and multiple prisms arranged between the translucent planar mirror and a viewer. The light from the blind spot area enters the translucent member, and travels along the translucent member while repeatedly reflecting between the translucent planar mirror and the planar mirror. Among the light entered the translucent member, partial light travels in a display direction from where the viewer views after transmitting through the multiple prisms. With this configuration, the viewer can visually recognize an image of the blind spot area. The apexes of the multiple prisms on the viewer side are arranged on the same plane.

According to a study of the inventors of the present disclosure, in some cases, a blind spot display device to be viewed by a viewer is attached to a curved surface of an obstacle. When the above-described known blind spot display device is attached to a curved surface, a shape of a display surface of blind spot display device viewed from a view point of user greatly differs from a shape of the obstacle viewed from the view point of user. This shape difference in appearance between the display device and the obstacle may degrade design sense of the display device.

According to an aspect of the present disclosure, a blind spot display device displaying an image of a blind spot blocked by an obstacle. The blind spot display device includes an incidence surface, a light guide member, a first reflecting surface, a second reflecting surface, and multiple prism portions. External environment light beams transmitted from the blind spot enter the incidence surface. The light guide member guides the external environment light beams entered through the incidence surface. The first reflecting surface is arranged opposite to the blind spot with respect to the light guide member. The external environment light beams guided by the light guide member are reflected on the first reflecting surface. The second reflecting surface are arranged close to the blind spot with respect to the light guide member. The second reflecting surface is opposed to the first reflecting surface. The external environment light beams guided by the light guide member reflect on the second reflecting surface. The prism portions are arranged opposite to the blind spot with respect to the light guide member and protrude toward a display region. The display region is defined as a region opposite to the blind spot with respect to the light guide member. The external environment light beams emit toward the display region through the prism portions after traveling through the light guide member. The external environment light beams enter the light guide member through the incidence surface, and then reflect alternately on the first reflecting surface and the second reflecting surface while traveling in an arranging direction of the plurality of prism portions distant from the incidence surface. A part of the external environment light beams emit toward the display region through the plurality of prism portions. Apexes of the plurality of prism portions are arranged in a three dimensional manner not along a plane.

In the above configuration, the apexes of the prism portions are arranged in a three dimensional manner, but not arranged along a plane. Thus, a display surface of the blind spot display device is configured to have a curve-shaped appearance.

Hereinafter, embodiments of the present disclosure will be described with reference to the accompanying drawings. In the following embodiments, components that are the same as or equivalent to those described in the preceding embodiment(s) will be indicated by the same reference symbols, and the description thereof may be omitted. In the following embodiments, when only partial configuration is described in one embodiment, remaining configuration may adopt same configurations as that described in the preceding embodiments. The multiple embodiments described herein may be partially combined with one another as long as there is no technical contradiction although there is no explicit description of these combinations.

First Embodiment

The following will describe a first embodiment with reference to FIG. 1 to FIG. 6. As shown in FIG. 1, a blind spot display device 1 of the present embodiment is attached to a front pillar 92 disposed close to a drivers seat of a vehicle. The front pillar 92 is located between a side window 93 close to the drivers seat of the vehicle and a windshield 94, and a bottom portion of the front pillar is connected to an instrument panel 95 of the vehicle.

This blind spot display device 1 displays an image of a blind spot area blocked by the front pillar 92. For example, as shown in FIG. 1, even though a part of a pedestrian 96 enters the blind spot area, the pedestrian can be viewed by the blind spot display device 1.

The blind spot area blocked by the front pillar 92 refers to an external area of the vehicle which is hidden behind the front pillar 92 from a view point of an occupant sitting in the driver's seat. The front pillar 92 is a member that ensures a rigidity of the vehicle, but it also corresponds to an obstacle that causes such a blind spot area.

Figure 2:
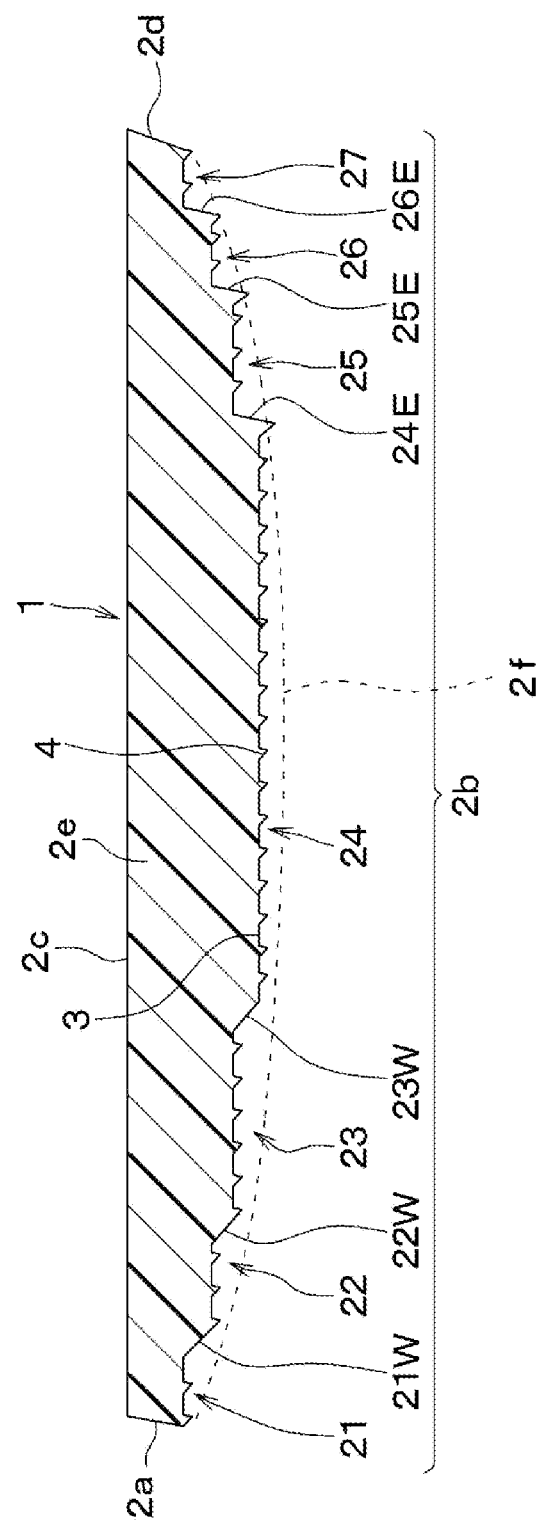
FIG. 2 is a cross-sectional view of a blind spot display device.

The blind spot display device 1 is provided by an optical member. As shown in FIG. 2, the blind spot display device 1 includes an incidence surface 2a, an exit surface 2b different from the incidence surface 2a, and a planar reflecting surface 2c facing the exit surface 2b. Since the reflecting surface 2c is disposed on blind spot side, the reflecting surface is also referred to as a blind spot side reflecting surface. The blind spot side reflecting surface 2c corresponds to a second reflecting surface. FIG. 2 is a cross-sectional view of the blind spot display device 1 taken along a cross section perpendicular to an up to down direction of the vehicle. In the following description, the term "cross section" refers to a cross section perpendicular to the up to down direction of the vehicle. A cross sectional shape of the blind spot display device 1 may be the same at any position in the up to down direction of the vehicle, or may be different corresponding to change of the position in the up to down direction of the vehicle.

The blind spot display device 1 includes an end surface 2d arranged farthest from the incidence surface 2a. The end surface 2d connects the exit surface 2b and the blind spot side reflecting surface 2c. The blind spot display device 1 further includes a translucent light guide member 2e surrounded by the incidence surface 2a, the exit surface 2b, the blind spot side reflecting surface 2c, and the end surface 2d. The incidence surface 2a, the exit surface 2b, the blind spot side reflecting surface 2c, and the end surface 2d also correspond to surfaces of the light guide member 2e.

The exit surface 2b is on an opposite side of the blind spot side reflecting surface 2c with respect to the light guide member 2e. The light guide member 2e includes multiple display side reflecting surfaces 3 and multiple prism portions 4. The multiple prism portions 4 are arranged side by side in a direction from the incidence surface 2a to the end surface 2d along the exit surface 2b. The display side reflecting surfaces 3 are arranged separately from one another, and each display side reflecting surface 3 is arranged between two prism portions 4. Each display side reflecting surface 3, which is separately arranged from one another, is provided by a flat portion 3a that is flat and parallel to each other. The display side reflecting surface 3 corresponds to a first reflecting surface. The cross section shown in FIG. 2 includes the incidence surface 2a, the exit surface 2b, the blind spot side reflecting surface 2c, the end surface 2d, and the light guide member 2e.

Figure 3:
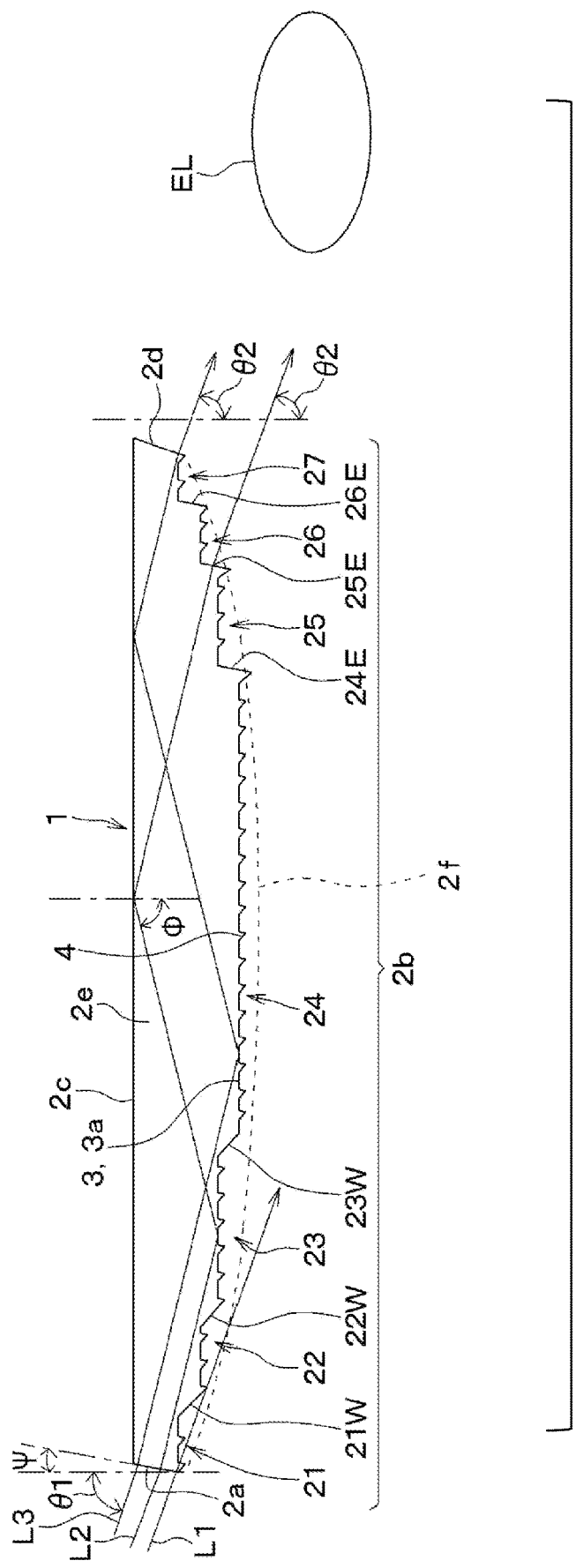
FIG. 3 is a diagram showing paths of external environment light beams on the cross section shown in FIG. 2.

As shown in FIG. 3, in the blind spot display device 1, external environment light beams L1, L2, L3 are incident on the incidence surface 2a from the blind spot area. After the external environment light beams L1, L2, L3 enter the incidence surface 2a, the light beams are guided by the light guide member 2e and are transmitted through the light guide member 2e. Each light beam is alternately reflected on the display side reflecting surface 3 and the blind spot side reflecting surface 2c. While repeating the reflections, the light beams move away from the incidence surface 2a in the arranging direction of the multiple prisms 4, and a part of the external environment light beams gradually passes through the prisms 4 toward a display side. The display side is also referred to as a display region, and indicates a region opposite to the blind spot with respect to the light guide member 2e. That is, the display side faces a view area of a driver who is the observer. A part of the external environment light beams from the blind spot area enters the incidence surface 2a, passes through the light guide member 2e, and exits the blind spot display device 1 from the end surface 2d. The external environment light beams L1, L2, L3 travel parallel to each other in the cross sections shown in FIG. 3.

The light guide member 2e is made of, for example, resin material such as polyethylene terephthalate, polycarbonate, polyethylene, acrylic, or translucent material such as glass. The light guide member is designed such that the external environment light beams L1, L2, L3 are totally reflected on the display side reflecting surface 3 and the blind spot side reflecting surface 2c thereby being guided inside of the light guide member. Specifically, the light guide member 2e has a refractive index n1 defined by the corresponding material, an external medium outside of the light guide member 2e has a refractive index n2. An incidence angle of each external environment light beam L1, L2, L3 on the display side reflecting surface 3 and on the blind spot side reflecting surface 2c is defined as ϕ. Further, when the external medium is air, the refractive index n2=1.

The light guide member satisfies the following numeral expression (1).

$$\sin \phi \geq n2/n1 \quad (1)$$

As a result, even when the blind spot display device 1 does not have a semi-transmissive mirror, a part of the external environment light beams L1, L2, L3 entering the incidence surface 2a are totally reflected on the flat portions 3a of the display side reflecting surface 3 and the blind spot side reflecting surface 2c, and exit from the exit surface 2b.

For example, as shown in FIG. 3, each external environment light beam L1, L2, L3 enters the incidence surface 2a of the blind spot display device 1 at an incidence angle θ1, and is refracted on the incidence surface 2a. Then, each light beam arrives at the exit surface 2b. The external environment light beams L2, L3 arrive at the respective flat portions 3a of the display side reflecting surface 3 with the same light guide angle ϕ, and are totally reflected on a boundary plane between the light guide member and external side. Thus, the external environment light beams L2, L3 are guided in the light guide member 2e toward the blind spot side reflecting surface 2c without exiting from the light guide member 2e. The external environment light beam L2, which has reached the blind spot side reflecting surface 2c at the light guide angle ϕ, is totally reflected on the blind spot side reflecting surface 2c again, and is guided in the light guide member 2e toward the exit surface 2b. The blind spot side reflecting surface 2c also corresponds to a boundary plane between the light guide member and external side. A part of the light beams is refracted by a transmission surface 4a of one prism portion 4 and exits from the prism portion toward outside with an exit angle of θ2, and remaining part of the light beams is totally reflected by the flat portion 3a.

For example, as shown in FIG. 3, when the external environment light beam L2 enters from the incidence surface 2a, a part of the light beam reaches the transmission surface 4a of the prism portion 4 and is refracted on the boundary thereby being exit to the outside with the exit angle of θ2. The external environment light beam L3 does not reach the prism portion 4 even after being repeatedly reflected on the flat portion 3a and the blind spot side reflecting surface 2c. The external environment light beam L3 finally reaches the end surface 2d and is emitted to the outside as afterglow. As described above, each external environment light beam L1, L2 is alternately reflected on the display side reflecting surface 3 and the blind spot side reflecting surface 2c. While repeating the reflections, the light beams move away from the incidence surface 2a in the arranging direction of the multiple prisms 4, and a part of the external environment light beams gradually pass through the prisms 4 toward the display side. As a result, a viewing area on a side of the exit surface 2b, that is, an area where the external environment light beam exit from the blind spot display device can be visually recognized by the driver can be broadened. The driver corresponds to a user of the blind spot display device.

The incidence angle θ1 refers to an angle between a normal direction, which is perpendicular to the multiple flat portions 3a of the exit surface 2b (hereinafter referred to as flat portion normal direction), and an incidence direction of each external environment light beam L1, L2, L3 incident on the incidence surface 2a. The light guide angle ϕ refers to an angle between a traveling direction of each external environment light beam L1, L2, L3 and the flat portion normal direction. The light guide angle ϕ also refers to an angle between the traveling direction of each external environment light beam L2, L3 with respect to the blind spot side reflecting surface 2c and a normal direction with respect to the blind spot side reflecting surface 2c. When the flat portion 3a is parallel to the blind spot side reflecting surface 2c, the light guide angle ϕ on the flat portion 3a and the blind spot side reflecting surface 2c has the same value regardless of reflection counts. The exit angle θ2 refers to an angle between the traveling direction of the external environment light beam L1, L2 exit from the exit surface 2b and the flat portion normal direction. When the incidence surface 2a is parallel to transmission surface 4a of the prism portion 4, the exit angle θ2 has the same value as that of the incidence angle θ1. A posture of the blind spot display device 1 is determined so that the flat portion normal direction and the normal direction of the incidence surface 2a are parallel to a horizontal plane of the vehicle. As another example, the flat portion normal direction and the normal direction of the incidence surface 2a may be inclined with respect to the horizontal plane of the vehicle.

The external environment light beams L1, L2, L3 are merely examples of external environment light beams, which are transmitted from the blind spot area and enter the incidence surface 2a. Some of the external environment light beams transmitted from the blind spot area and entering the incidence surface 2a may have incidence angles and light guide angles different from the incidence angle θ1 and the light guide angle ϕ of the above-described external environment light beams L1, L2, L3. Some or all of the external environment light beams exiting from each transmission surface 4a reaches the driver's eyelipse EL. The external environment light beams, as a whole, are incident on the incidence surface 2a at the incidence angle of θ1 with a certain width, and are totally reflected at the flat portion 3a and the blind spot side reflecting surface 2c at the light guide angle ϕ with the certain width. Then, the light beams exit from the transmission surface 4a toward the display side, and exit light beams cover an entire view range of the eyellipse EL.

The light guide angle ϕ may be set based on, for example, the light guide angle corresponding to a maximum incidence angle of the external environment light beam incident on the light guide member 2e. The maximum incidence angle of external environment light beam may be set as an angle between the flat portion normal direction shown in FIG. 3 and a virtual straight line extending from a center of the eyelipse EL to an end point of the incidence surface 2a on the exit surface 2b side. This is because the external environment light beams, which have incidence angles equal to or greater than the maximum incidence angle, are transmitted from an area visible to the user. Alternatively, at least a part of the external environment light beams may satisfy the light guide angle ϕ defined by the above numeral expression (1). The part of the external environment light beams may include the entire external environment light beams that reach the eyelipse EL. When the eyelipse EL cannot be defined, the part of the external environment light beams may be set regardless of the eyelipse. These apply to all relational expressions including ϕ, θ1, and θ2, which will be described later.

In the present embodiment, the incidence surface 2a, on which the external environment light beams are incident, intersects with the exit surface 2b. The incidence surface 2a is inclined at an inclination angle ψ with respect to the flat portion normal direction. That is, in the present embodiment, the incident surface 2a is inclined toward the flat portion so that the angle between the incidence surface and the flat portion 3a is an acute angle. The incident surface 2a has the inclination angle ψ with respect to the flat portion normal direction. For example, as shown in FIG. 3, the inclination angle ψ may be set to be smaller than the light guide angle φ formed between (i) the traveling direction of external environment light beam L1, L2, L3 after entering the incidence surface 2a and (ii) the flat portion 3a or the blind spot side reflecting surface 2c. At this time, when ψ<π/2−φ based on a refraction condition, the external environment light beam L1, L2, L3 is refracted in a direction such that the light guide angle φ is greater than the incident angle θ1 of the external environment light beam L1, L2, L3. In this case, the external environment light beams can be guided toward a relatively broad range of the exit surface 2b. The light guide angle φ is set under the condition of total reflection and a refractive index of normal translucent resin material is 1.4 or more. Thus, n×sin φ>1 and thereby φ>45.3 degrees. Thus, the light guide member 2e has a structure that satisfies φ>ψ.

The exit surface 2b includes the display side reflecting surface 3, and the display side reflecting surface 3 includes multiple flat portions 3a and multiple prism portions 4. The exit surface 2b has a stepped shape as a hole. The stepped shape is a shape that includes multiple steps. Each of the multiple steps is referred to as a display side step, and corresponds to a first step.

As shown in FIG. 2 and FIG. 3, each display side step 21 to 27 protrudes from the blind spot side reflecting surface 2c toward the display side, and a position form where each display side step protrudes from the blind spot side reflecting surface is different from one another. In the present embodiment, a distance from the blind spot side reflecting surface 2c to an end of each display side step along the protruding direction is different from one another. The display side is an opposite side of a blind spot side where the blind spot is positioned with respect to the blind spot side reflecting surface 2c. In the present embodiment, the protruding direction is parallel to the flat portion normal direction. In another example, the protruding direction may be set to be not parallel to the flat portion normal direction.

A longitudinal direction of each display side step intersects with an up to down direction of the vehicle, intersects with a direction from the incidence surface 2a to the end surface 2d, and intersects with the flat portion normal direction. The longitudinal direction of each display side step is a direction in which the step maintains the same, that is, a direction intersects with an alignment direction of the multiple display side steps. The multiple display side steps 21 to 27 are arranged from the incidence surface 2a toward the end surface 2d.

On the exit surface 2b, the multiple display side steps 21 to 27 are arranged in a direction from a side close to the incidence surface 2a to a side far from the incidence surface 2a. The exit surface 2b has inclined surfaces 21W, 22W, 23W, 24E, 25E, 26E each of which is arranged between two adjacent display side steps 21 to 27.

The display side step 22 protrudes toward the display side more than the display side step 21, the display side step 23 protrudes toward the display side more than the display side step 22, and the display side step 24 protrudes toward the display side more than the display side step 23. The display-side step 26 protrudes toward the display side more than the display side step 27, the display side step 25 protrudes toward the display side more than the display side step 26, and the display side step 24 protrudes more than the display side step 25.

The inclined surface 21W connects the display side step 21 and the display side step 22. The inclined surface 22W connects the display side step 22 and the display side step 23. The inclined surface 23W connects the display side step 23 and the display side step 24. The inclined surfaces 21W, 22W, 23W are arranged toward the incidence surface 2a, but not toward the end surface 2d. That is, the inclined surfaces 21W, 22W, 23W are arranged toward the windshield 94. The inclined surface 24E connects the display side step 24 and the display side step 25. The inclined surface 25E connects the display side step 25 and the display side step 26. The inclined surface 26E connects the display side step 26 and the display side step 27. The inclined surfaces 24E, 25E, 26E are arranged toward the end surface 2d, but not toward the incidence surface 2a. That is, the inclined surfaces 24E, 25E, 26E are arranged toward the eyellipse.

Each display side step 21 to 27 includes multiple flat portions 3a and multiple prism portions 4. In each display side step, the multiple prism portions 4 and the multiple flat portions 3a are alternately arranged from the incidence surface 2a to the end surface 2d. In each display side step, the multiple flat portions 3a are arranged at the same position in the protruding direction of the display side step. In the protruding direction of the display side step, the position of the multiple flat portions 3a in one display side step is different from the position of the multiple flat portions 3a in another display side step. In the protruding direction of the display side step, the position of the multiple prism portions 4 in one display side step is different from the position of the multiple prism portions 4 in another display side step.

The multiple display side steps 21 to 27 and the inclined surfaces 21W, 22W, 23W, 24E, 25E, 26E configure a virtual pseudo curved surface 2f. The pseudo curved surface has a non-planar three-dimensional shape substantially along positions of apexes of the multiple transmission surfaces 4a. The pseudo curved surface 2f is arranged smoothly along an outline of the front pillar 92 to which the blind spot display device 1 is attached. In a state where the blind spot display device 1 is attached to the front pillar 92, an outer shape of the blind spot display device 1 on the display side is viewed by the occupant in the vehicle as the pseudo curved surface 2f that is arranged smoothly along the front pillar 92. Thus, visual design effect of the blind spot display device 1 can be improved.

In each of the display side step 21 to 27, the external environment light beams are totally reflected by partial or all of the flat portions 3a included in the display side step. In each of the display side steps 21 to 27, the external environment light beams are transmitted through partial or all of the transmission surfaces 4a of the prism portions 4 included in the display side step, and then the light beams are emitted toward the display side.

In the present embodiment, the prism portion 4 is arranged at a position where the incidence surface 2a intersects with the display side step 21. The exit surface 2b may be shaped by, for example, a known plastic molding method using a mold.

The end surface 2d connects the exit surface 2b and the blind spot side reflecting surface 2c on the opposite side of the incidence surface 2a. For example, the end surface may be an inclined surface which is inclined at a predetermined angle with respect to the blind spot side reflecting surface. Part of the external environment light beams are repeatedly reflected by the display side reflecting surface 3 and the blind spot side reflecting surface 2c, and fail to reach the prism portion 4 finally. These external environment light beams are emitted toward the outside from the end surface 2d as afterglow. It is possible to prevent the emission of afterglow by applying a light shielding treatment such as arranging a light absorption film (not shown) on the end face 2d. As a result, it is possible to suppress the occurrence of ghosts due to leakage of afterglow.

As shown in FIG. 3, the multiple flat portions 3a in each display side step function as reflecting surfaces that totally reflect the external environment light beams reaching the flat portions 3a toward the blind spot side reflecting surface 2c. As a result, the light guide member 2e can guide the external environment light beams within the light guide member without using a semi-transmissive mirror made of metal material or dielectric material. Further, a loss caused by absorption of the external environment light beams by the flat portion 3a can be restricted.

Figure 4:
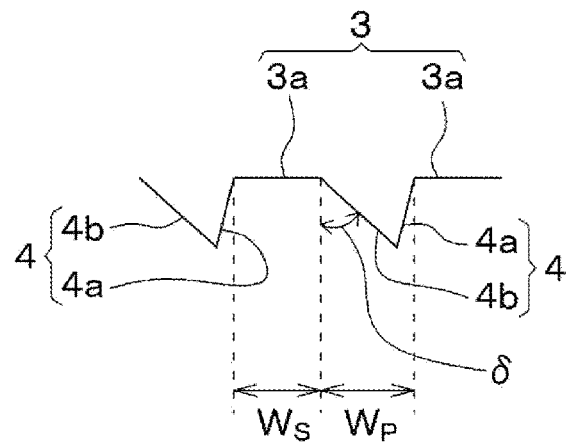
FIG. 4 is an enlarged view of an exit surface on the cross section shown in FIG. 2.
Figure 5:
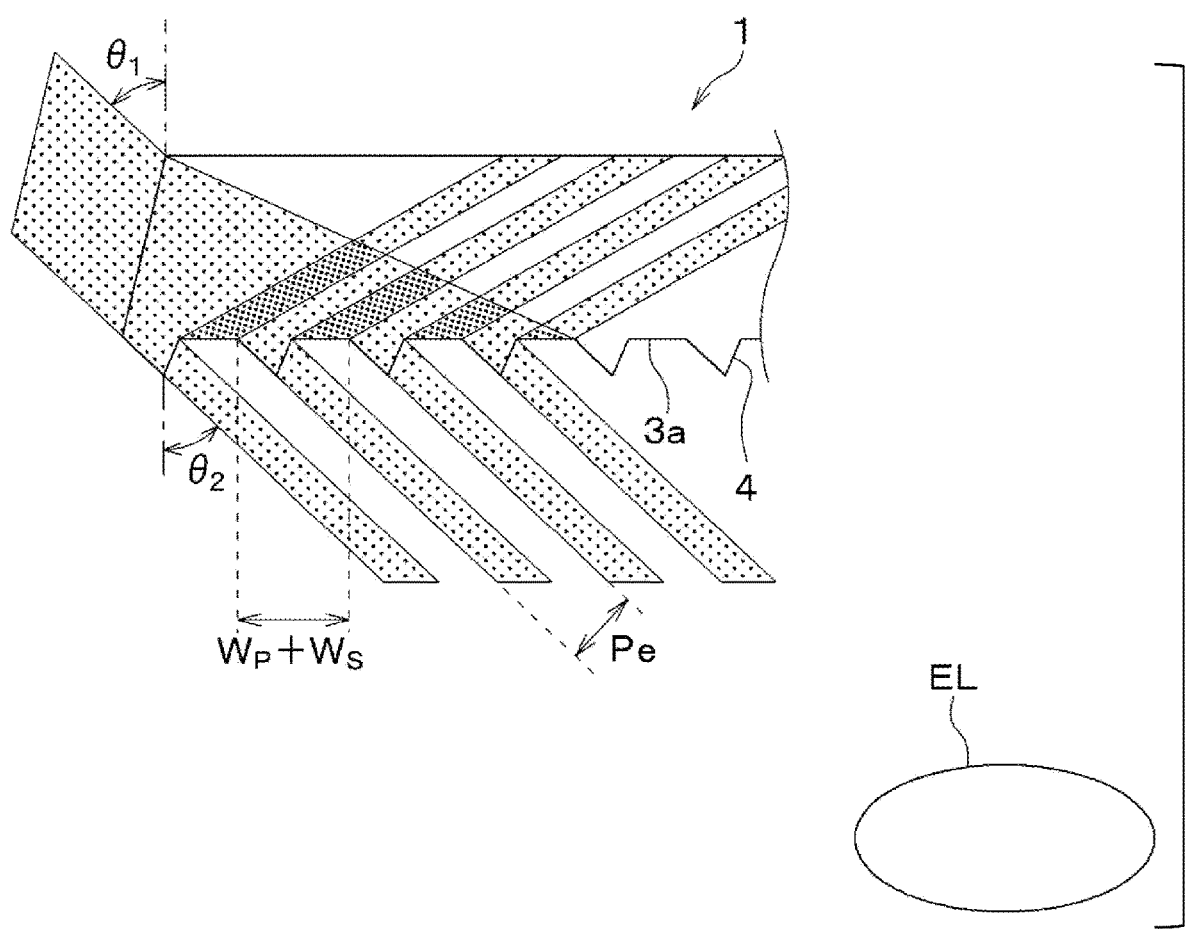
FIG. 5 is an enlarged view of paths of external environment light beams on the cross section shown in FIG. 2.

As shown in FIG. 4, each flat portion 3a has a width Ws along a light guide direction in which the light beam is guided along the flat portion from the incidence surface 2a toward the end surface 2d. The width Ws of each flat portion 3a is set such that a reflectance of the external environment light beam on the exit surface 2b is equal to or higher than a predetermined value. Specifically, in each display side step, multiple flat portions 3a reflect the external environment light beams, and multiple prism portions 4 absorb and emit the external environment light beams. Thus, the reflectance Rw of the exit surface 2b is determined by a proportion of the flat portion 3a. The reflectance Rw of the exit surface 2b is represented by the following numeral expression (2), where Wp indicates a width of the prism portion 4 in the light guide direction. As described above, the prism portion 4 having the width Wp is adjacent to the flat portion 3a having the width Ws.

$$Rw = Ws/(Wp+Ws) \quad (2)$$

The multiple flat portions 3a satisfy Rw≥0.5. That is, the width Ws of the flat portion is set such that the reflection of external environment light beams on the exit surface 2b is equal to or greater than the emitting of the external environment light beams. Thus, the widths Wp and Ws satisfy a relationship Wp/Ws 1. With above configuration of the blind spot display device 1, half or more of the external environment light beams reflect on the exit surface 2b, and are guided toward a direction away from the incidence surface 2a. Thus, the external environment light beams can be emitted from a wider range of the exit surface 2b, and a brightness of the external environment light beams emitted toward the display side through the exit surface 2b can be ensured.

When the above numeral expression (1) is satisfied and the light guide angle φ is the total reflection angle, as shown in the numeral expression (2), the reflectance Rw of the exit surface 2b is defined only by the width ratio of the flat portion 3a to the prism portion 4. In other words, the reflectance Rw does not depend on the incidence angle or wavelength of the external environment light beam incident on the incidence surface 2a. Therefore, compared with a conventional optical member using a semi-transmissive mirror, the changes in the color and brightness of external environment light beam transmitted through the prism portion 4 and emitted toward outside are suppressed.

In the exit surface 2b, each prism portion 4 is arranged adjacent to the flat portion 3a and protrudes toward the display side with respect to the flat portion 3a. Each prism portion 4 has the transmission surface 4a that emits part of the external environment light beams passing through the light guide member 2e toward outside. Each prism portion 4 also has an opposing surface 4b that faces the transmission surface 4a and intersects with the transmission surface 4a. In each prism portion 4, the transmission surface 4a is disposed on the side of the end surface 2d and the opposing surface 4b is disposed on the side of the incidence surface 2a. In each prism portion 4, the transmission surface 4a intersects with the opposing surface 4b at the apex of the prism portion 4 in the protruding direction. The cross-sectional shapes of multiple prism portions 4 are similar to each other. The sizes of all prism portions 4 may be the same, or may be different.

In the protruding direction of each display side step 21 to 27, the positions of the flat portions 3a in one display side step are different from the positions of the flat portions in another display side step. Similarly, in the protruding direction of each display side step 21 to 27, the positions of the apexes of the prism portions 4 in one display side step are different from the positions of the apexes of the prism portions 4 in another display side step. As a result, the positions of the apexes of multiple prism portions 4 are arranged in three-dimensional manner, but not along a plane. Note that the term "not along a plane" excludes a case where the arrangement is shifted from the planar arrangement by an unavoidable processing error. For example, the term "not along a plane" means that, when the shortest apex distance from the position of the apex of each prism portion 4 to a certain reference plane P is d, the reference plane is defined such that a sum of the shortest apex distances d of all of the prism portions 4 is minimized. In such a case, when the average value of the shortest distances d of all of the prism portions 4 is 3% or more of the longest apex distance X of one prism portion, the apexes of the prism portions 4 are deemed to be arranged in three-dimensional manner not along a plane as whole. Here, the longest apex distance X is the distance between the two apexes among all of prism portions 4 that are disposed farthest apart from one another.

In each display side step, as described above, the positions of the flat portions 3a in the protruding direction are different from those in another display side step. Thus, the positions of the flat portions 3a in the protruding direction are arranged in three-dimensional manner not along a plane as a whole. Herein, the meaning of term "not along a plane" is the same as that of the prism portion 4.

Each transmission surface 4a is parallel to the incidence surface 2a. When the transmission surface 4a is parallel to the incidence surface 2a, the exit angle θ2 of each external environment light beam L1, L2, L3 emitting from the transmission surface 4a is the same as the incidence angle θ1. Thus, by the blind spot display device 1, the user can visually recognize light beam same as the external environment light beam L1 on the side of the exit surface 2b. As described above, the incidence surface 2a is parallel to the transmission surface 4a. The term "parallel" includes a case where that the incidence surface 2a is approximately parallel to the transmission surface 4a with consideration of unavoidable errors due to the processing accuracy of the light guide member 2e. The same applies to the term "parallel to" in the following description of present disclosure.

For example, as shown in FIG. 4, the opposing surfaces 4b of each prism portion 4 is angled against the flat portion normal direction at an inclination angle of δ, and intersects with the transmission surface 4a. Each opposing surface 4b is covered with a light absorbing film, which is not shown. The light absorbing film suppresses reflection of external environment light beams passing through the light guide member 2e on the opposing surface 4b and entry of external environment light beam from the exit surface 2b. As a result, it is possible to suppress occurrence of ghost which is generated when the external environment light beam emitted from the transmission surface 4a toward the display side overlaps with external environment light beam existing on the display side. Further, it is possible to suppress noise caused by unintentional reflection of external environment light beams passing through the light guide member 2e on the opposing surface 4b and emission of the external environment light beam from the transmission surface 4a. The light absorbing film may be made of any light-shielding resin material, light-shielding metal material, and may be arranged on the opposing surface by a proper processing, such as printing or vapor deposition.

The opposing surface 4b has the inclination angle of δ which is equal to or greater than the exit angle θ2. The exit angle θ2 is an angle at which the external environment light beam emits from each transmitting surface 4a. When the incidence surface 2a is parallel to the transmission surface 4a, the inclination angle of δ is equal to or greater than the incidence angle θ1 of the external environment light beam L1. As a result, the external environment light beam exit from each transmission surface 4a is emitted toward outside without being blocked by the opposing surface 4b. The inclination angle δ of each opposing surface 4b may be set to be smaller than the light guide angle φ, which is set with respect to the adjacent flat portion 3a. With this configuration, the interference caused by the incidence of the external environment light beam on the opposing surface 4b during traveling in the light guide member 2e can be suppressed. Thus, a possibility of unintended reflection of the external environment light beam on the opposing surface 4b during traveling in the light guide member 2e can be suppressed, and noise caused by such unintended reflection can be suppressed.

When the width Ws of each flat portion 3a is the same as the width Wp of each prism portion 4, a gap corresponding to the width Wp of the prism portion is included in the reflected light beam. A relationship between the gap included in the reflected beam and the prism portion 4 in the rear stage periodically changes, and this change causes brightness unevenness, which is known as moire pattern. From a viewpoint of suppressing such moire pattern, Ws and Wp may be set under a predetermined ratio rather than the same value.

For example, in the blind spot display device 1, a value obtained by dividing the standard deviation of the widths Ws of all flat portions 3a by an average value of the widths Ws of all flat portions 3a may be set within a predetermined range. A lower limit of the predetermined range may be 0.2, 0.3, 0.5, or 1.2. An upper limit of the predetermined range may be 0.5, 0.8, 1.0, 1.5, or 2.0. Note that the widths Ws of all flat portions 3a may be set with in a range of ±10% with respect to the average value.

For example, in the blind spot display device 1, a value obtained by dividing the standard deviation of the widths Wp of all prism portions by an average value of the widths Wp of all prism portions 4 may be set within a predetermined range. A lower limit of the predetermined range may be 0.2, 0.3, 0.5, or 1.2. An upper limit of the predetermined range may be 0.5, 0.8, 1.0, 1.5, or 2.0. Note that the widths Wp of all prism portions 4 may be set with in a range of ±10% with respect to the average value.

The numerical values of widths Ws and Wp are distributed as described above. Thus, it is possible to avoid the periodic relationship between the gap included in the external environment light beam reflected on the flat portion 3a and the after-stage prism portion 4, thereby suppressing the occurrence of moire pattern.

On the exit surface 2b, the external environment light beam is emitted only from the transmission surface 4a of the prism portion 4 at the exit angle θ2. Thus, as shown by dotted portion in FIG. 5, the external environment light beam reaches the user has a bright and dark pattern having a periodic width equal to the sum of the width Ws of the flat portion 3a and the width Wp of the prism portion 4. A pitch Pe of external environment light beams with the center of the eyelid EL as the viewpoint is expressed by the following numeral expression (3).

$$Pe=(Wp+Ws)\times\cos\theta2 \quad (3)$$

The width Ws of flat portion 3a and the width Wp of prism portion 4 adjacent to each other may be designed such that the pitch Pe of the external environment light beams emitted toward the display side is less than 2 mm. This is because the minimum pupil diameter of a person in a bright place is equal to or greater than 2 mm. By setting the pitch Pe of emitted external environment light beams to be less than 2 mm, the amount of external environment light beams visually recognized by the user is averaged, and the change in brightness caused by a movement of viewpoint can be suppressed.

It should be noted that multiple flat portions 3a may be not completely parallel to the blind spot side reflecting surfaces 2c. The multiple flat portions 3a may be arranged not parallel to the blind spot side reflecting surface 2c corresponding to a distance of the blind spot area to be visually recognized by the user.

When multiple flat portions 3a are parallel to the blind spot side reflecting surface 2c, the light guide angle φ has a constant value regardless of the position in the light guide member 2e. Thus, the exit angle θ2 of the emitted external environment light beam also has a constant value. Although the viewpoint position of user is different, the external environment light beams having the same exit angle θ2 enter the user's eye. Thus, above-described state is the same as a state where the light beams transmitted from infinitely far positions enter the user's eye. That is, when the blind spot area to be visually recognized by the user is located at a predetermined distance or longer (for example, several tens of meters to several hundreds of meters) from the user, the multiple flat portions 3a may be preferably parallel to the blind spot side reflecting surface 2c.

When the multiple flat portions 3a are slightly angled with the blind spot side reflecting surface 2c, the light guide angle φ changes according to a position in the light guide member 2e. Thus, the exit angle θ2 of the emitted external environment light beam changes according to the viewpoint position of user. Thus, this state is the same as a state where the light beams transmitted from a finite distance equal to or less than a predetermined value, such as several meters to several tens of meters, enter the user's eye. That is, when the blind spot area to be visually recognized by the user is located at the predetermined distance or less from the user, the multiple flat portions 3a may be preferably not parallel to the blind spot side reflecting surface 2c. In this case, the multiple flat portions 3a and the blind spot side reflecting surface 2c may be arranged such that a distance therebetween increases along a direction far from the incidence surface 2*a*. That is, the multiple flat portions 3*a* and the blind spot side reflecting surface 2*c* may be arranged to have an opening shape along the direction far from the incidence surface 2*a*. When the multiple flat portions 3*a* and the blind spot side reflecting surface 2*c* are arranged to have a closing shape along the direction far from the incidence surface 2*a*, the external environment light beams emitted from the device travel in scattering directions away from one another, and the emitted light beams cannot gather as an image in the human eye.

According to the present embodiment, the exit surface 2*b*, on which the external environment light beams entering from the incidence surface 2*a* first reach, includes the display side reflecting surface 3 configured by multiple flat portions 3*a* and multiple prism portions 4. Thus, the external environment light beams can be guided by the display side reflecting surface even without using a semi-transmissive mirror. Thus, the manufacturing process can be simplified and the manufacturing cost can be reduced as compared with the manufacturing process and cost of conventional optical member including a semi-transmissive mirror. In the blind spot display device 1, the external environment light beams are totally reflected by the flat portions 3*a* and the blind spot side reflecting surface 2*c* opposed to the flat portions 3*a*. Thus, light absorption loss by the light guide member 2*e* can be suppressed. The reflectance Rw of the external environment light beams on the exit surface 2*b* is determined by the ratio between the width Ws of the flat portion 3*a* and the width Wp of the prism portion 4 adjacent to each other. Thus, the reflectance Rw does not depend on the wavelength or angle of the external environment light beam. Thus, while suppressing light absorption loss in the light guide member 2*e*, it is also possible to suppress changes in the brightness and color tone of the external environment visually recognized by the user through the exit surface 2*b*.

The following will describe the inclined surfaces 24E, 25E, 26E. Each inclined surface 24E, 25E, 26E is parallel to some or all of the transmission surfaces 4*a* in the adjacent display side step (that is, predetermined step) disposed close to the incidence surface 2*a* with respect to the inclined surface. Among the multiple transmission surfaces 4*a* in the adjacent display side step 24, 25, 26 disposed close to the incidence surface 2*a* with respect to the inclined surface, certain transmission surface 4*a* belongs to the inclined surface. This certain transmission surface 4*a* is also parallel to the inclined surface. A part or all of the transmission surfaces 4*a* other than the one included in the inclined surface are parallel to the inclined surface.

Since the inclined surface 24E, 25E, 26E is inclined at above-described angle, the external environment light beam passing through the light guide member 2E and reaching the inclined surface 24E, 25E, 26E, for example, the external environment light beam L2 passes through the inclined surface 24E, 25E, 26E and proceeds toward the display side.

The external environment light beam emitted from the inclined surface 24E, 25E, 26E is parallel to the light beam that passes through some or all of the transmission surfaces 4*a* of the adjacent display side step 24, 25, 26, which is close to the incidence surface 2*a* with respect to the inclined surface. The external environment light beams exit from the slope 24E, 25E, 26E are transmitted toward the display side at the same angle as the angle of the external environment light beam entering the incidence surface 2*a* from the outside of the blind spot display device 1.

Thus, the external environment light beams exit from the inclined surfaces 24E, 25E, 26E allow the driver, who is a viewer, to visually recognize the view same as the external environment.

With respect to each inclined surface 24E, 25E, 26E, the display side step disposed close to the incidence surface 2*a* is referred to as precedent step, and the display side step disposed close to the end surface 2*d* is referred to as subsequent step. The subsequent step corresponds to a certain step.

Figure 6:
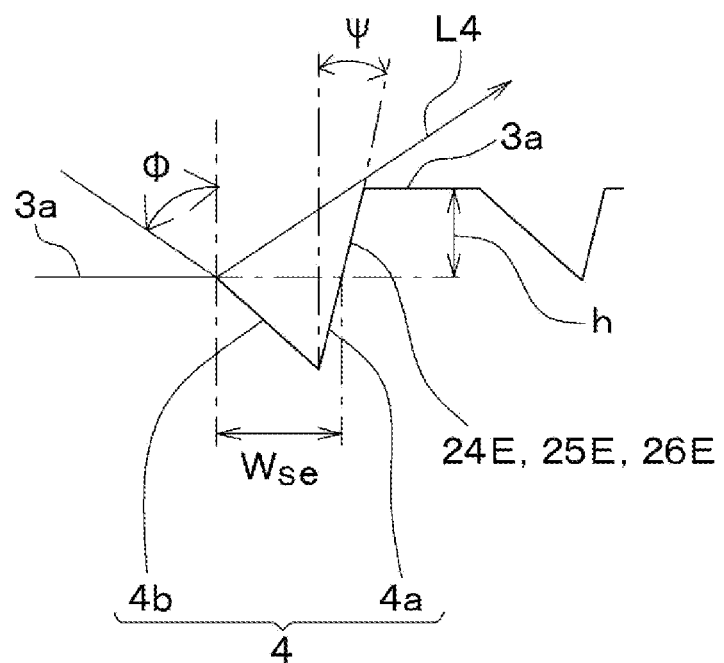
FIG. 6 is an enlarged view of an inclined portion of the exit surface and a periphery of the exit surface on the cross section shown in FIG. 2.

In the cross section of the blind spot display device 1 shown in FIG. 6, in an opposite protruding direction of the display side step, a length difference h between the flat portion 3*a* of the precedent step, which is disposed closest to the subsequent step, and the flat portion 3*a* of the subsequent step, which is disposed closes to the precedent step, is represented by the following numeral expression (4). The opposite protruding direction is a direction opposite to the protruding direction of the display side step.

$$h \leq Wse/\{\tan \phi \times (1-\tan \psi \times \tan \phi)\} \quad (4)$$

Here, $\psi$ is the acute angle of the inclined surface, which connects the precedent step and the subsequent step, with respect to the opposite protruding direction. In the above expression (4), $\phi$ is an acute angle, and is equal to the light guide angle $\phi$, which is formed between the external environment light beam and the opposite protruding direction when the external environment light beam exits from the exit surface 2*b* through the light guide member 2*e*. In the above expression (4), Wse is a width of the prism portion 4 of the precedent step, which is disposed closest to the subsequent step, in the direction perpendicular to the opposite protruding direction. The transmission surface 4*a* of the prism portion 4 that is closes to the subsequent step configures a part of the inclined surface.

With the above-described configuration, in the precedent step, the external environment light beam L4 reflected at a point of the flat portion 3*a* closest to the inclined surface is not blocked by the inclined surface, and can pass through the light guide member 2*e* and travel toward the blind spot side reflecting surface 2*c*. Thus, it is possible to prevent the external environment light beam L4 from exiting from the blind spot display device 1 due to the blocking of light beam by the inclined surface and becoming unnecessary light. That is, it is possible to suppress generation of unnecessary light. Note that the cross section shown in FIG. 6 is the same as the cross section shown in FIG. 2.

The following will describe inclined surfaces 21W, 22W, 23W. Each inclined surface 21W, 22W, 23W is provided by a light-shielding surface. For example, each inclined surface 21W, 22W, 23W may be entirely covered by a light absorbing film (not shown). Each inclined surface 21W, 22W, 23W may be entirely covered by a different material to function as light-shielding surface. Thus, the external environment light beams are not emitted from the light guide member 2*e* through the inclined surface 21W, 22W, 23W. Entering of external light from outside of the blind spot display device 1 into the light guide member 2*e* through the inclined surface 21W, 22W, 23W is also prevented.

With respect to each inclined surface 21W, 22W, 23W, the display side step disposed close to the incidence surface 2*a* is referred to as precedent step, and the display side step disposed close to the end surface 2*d* is referred to as subsequent step. The precedent step corresponds to a predetermined step.

The inclination angle of each inclined surface 21W, 22W, 23W is set such that the external environment light beam exit from the transmission surface 4a of the precedent step, which is disposed closest to the subsequent step, toward the display side is not blocked by the inclined surface. More specifically, the inclined surface is parallel to part or all of the opposing surfaces 4b (that is, the surfaces disposed close to the incidence side) included in the precedent step. The inclination angle is set such that at least a part of the external environment light beams transmitted through the transmission surface 4a and emitted toward the display side are not blocked by the inclination surface. For example, the inclination angle may be set such that all of the external environment light beams transmitted through the transmission surface 4a and emitted toward the display side are not blocked by the inclination surface. For another example, the inclination angle may be set such that only a part of the external environment light beams transmitted through the transmission surface 4a and emitted toward the display side are not blocked by the inclination surface. For another example, the inclination angle may be set such that the external environment light beams transmitted through the transmission surface 4a and reaching the center of the eyellipse EL are not blocked by the inclination surface. For another example, the inclination angle may be set such that the external environment light beams, which are transmitted through the transmission surface 4a, emitted toward the display side, and reach a lateral end of the eyellipse EL in the vehicle width direction, are not blocked by the inclination surface.

The opposing surface 4b of each prism portion 4 is set at an angle such that the opposing surface does not block the external environment light beam directed toward a center end of the drivers eyellipse EL in the vehicle width direction. That is, the external environment light beam emitted from the transmission surface 4a of each prism portion 4 is not blocked by the adjacent opposing surface 4b disposed close to the end surface 2d.

Each inclined surface 21W, 22W, 23W is parallel to part or all of the opposing surfaces 4b in the precedent step. Thus, the external environment light beam emitted from the transmission surface 4a of precedent step toward the display side can be prevented from being blocked by the length difference of adjacent two display side steps. That is, external environment light beam emitted from the transmission surface 4a of precedent step toward the display side can reach the eyellipse of the driver by avoiding the length difference of adjacent two display side steps.

As shown in FIG. 2 and FIG. 3, among the display side steps 21 to 27, the display side step 24 protrudes most toward the display side, and the display side steps 21, 22, 23 are disposed close to the incidence surface 2a with respect to the display side step 24. In each of the display side steps 21 to 24, the prism portion 4 is arranged at the end on the incidence surface 2a side, instead of the flat portion 3a. By this configuration, reflection and transmission of unnecessary light entering the display side step from the outside of the blind spot display device 1 can be suppressed by the opposing surface 4b of prism portion 4, which has the light shielding characteristic.

Among the display side steps 21 to 27, the display side step 24 protrudes most toward the display side, and the display side steps 25, 26, 27 are disposed close to the end surface 2d with respect to the display side step 24. In each of the display side steps 24 to 27, the prism portion 4 is arranged at the end on the end surface 2d side, instead of the flat portion 3a. The prism portion 4, which is arranged at the end of each display side step on the end surface 2d side, has the width Wse in the direction perpendicular to the protruding direction of the display side step. The width Wse of the prism portion 4 arranged at the end of each display side step on the end surface 2d side is greater than the widths of other prism portions 4 in the same display side step. By setting the width Wse of the end prism portion 4 greater than widths of other prism portions 4, it is possible to prevent generation of unnecessary light even though the height h of the inclined surface in the opposite protruding direction is increased in view of the above-described numeral expression (4).

Each of the inclined surfaces 21W, 22W, 23W is away from the incidence surface 2a and becomes close to the end surface 2d in the direction toward the display side. Thus, when the light guide member 2e is integrally molded using a molding die, removing of the light guide member from the mold can be carried out in an easy manner.

As described above, the display side apexes of the prism portions 4 are arranged in the three-dimensional manner not along a plane. With this arrangement, a display side surface of the blind spot display device 1 appears to have a curved shape. For example, the prism portions 4 may be arranged such that a visual shape of the display side surface of the blind spot display device 1 follows a surface shape of the front pillar 92 to which the blind spot display device is attached.

(i) The display side reflecting surface 3 is divided into multiple flat portions 3a, and the multiple flat portions 3a are alternately arranged with multiple prism portions 4. That is, each flat portion 3a is sandwiched by the prism portions 4, and each prism portion 4 is sandwiched by the flat portions 3a. Each prism portion 4 protrudes toward the display side more than an adjacent portion of the display side reflecting surface 3 (that is, the adjacent flat portion 3a). The display side reflecting surface 3 as a whole is arranged in a three-dimensional manner not along a plane.

By arranging the display side reflecting surface 3 in a three-dimensional manner as described above, the need to implement a three-dimensional shape only by the protruding levels of the prism portions 4 is reduced, and variations in the protruding levels of the prism portions 4 can be suppressed. As a result, it is possible to reduce the possibility that external environment light beam exit from a certain prism portion 4 toward the display side is blocked by another prism portion.

(ii) The exit surface 2b has multiple prism portions 4 and the display side reflecting surface 3 has a stepped shape as a whole. As described above, the exit surface 2b includes multiple display side steps 21 to 27. The multiple display side steps 21 to 27 include the precedent step and the subsequent step. The subsequent step is adjacent to the precedent step and is far from the incidence surface 2a relative to the precedent step. The subsequent step protrudes more than the precedent step toward the display side. The precedent step corresponds to a certain display side step, and the subsequent step corresponds to a next display side step. The inclined surface 21W, 22W, 23W connecting the precedent step and the subsequent step is arranged at the inclination angle under which the external environment light beam passing through the prism portion of the precedent step, which is arranged closest to the subsequent step, toward the display side is not blocked by the inclined surface.

Since the inclined surface is inclined as described above, the appearance of the display side surface of the blind spot display device 1 can have a curved shape while suppressing the possibility that the visibility of external environment light beams is impaired by the inclined surface.

(iii) Among the multiple prism portions 4, the inclined surface 21W, 22W, 23W is disposed parallel to an incidence side surface of at least one prism portion in the precedent step. The incidence side surface of at least one prism portion is the surface arranged close to the incidence surface 2a in the prism portion. The possibility that the visibility of external environment light beams is impaired by the inclined surface 21W, 22W, 23W can be suppressed similar to the incidence surface 2a of the prism portion 4 in the precedent step.

(iv) The above-described numeral expression (4) is established on the cross section parallel to the external environment light beams. The cross section includes incidence surface 2a, the light guide member 2e, the display side reflecting surface 3, the blind spot side reflecting surface 2c, and multiple prism portions 4. By suppressing the height h as described above, a possibility that the light reflected by a portion of the display side reflecting surface 3, which is closest to the subsequent step in the precedent step, is blocked by the inclined surface 24E, 25E, 26E, which connects the precedent step and the subsequent step, before reaching the blind spot side reflecting surface 2c can be suppressed. As a result, the light utilization efficiency can be improved.

Second Embodiment

Figure 7:
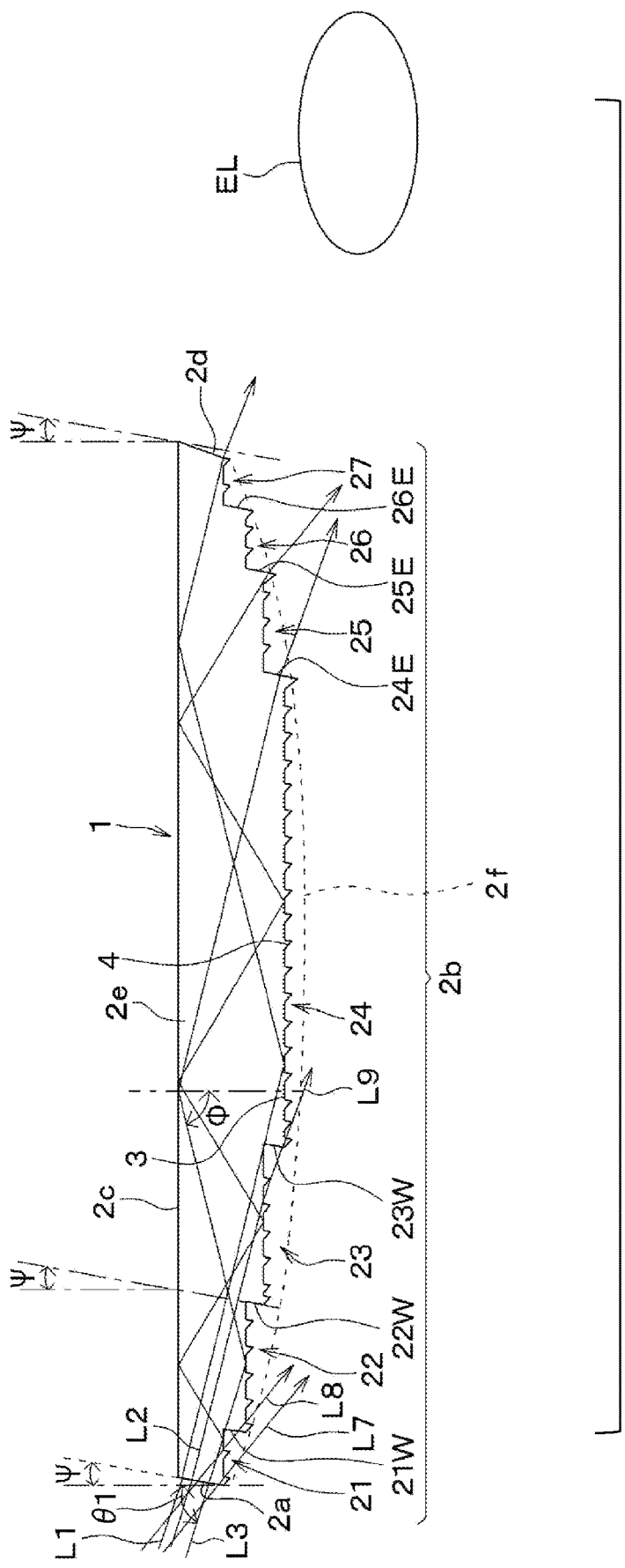
FIG. 7 is a diagram showing a cross section of a blind spot display device and paths of external environment light beams according to a second embodiment.
Figure 8:
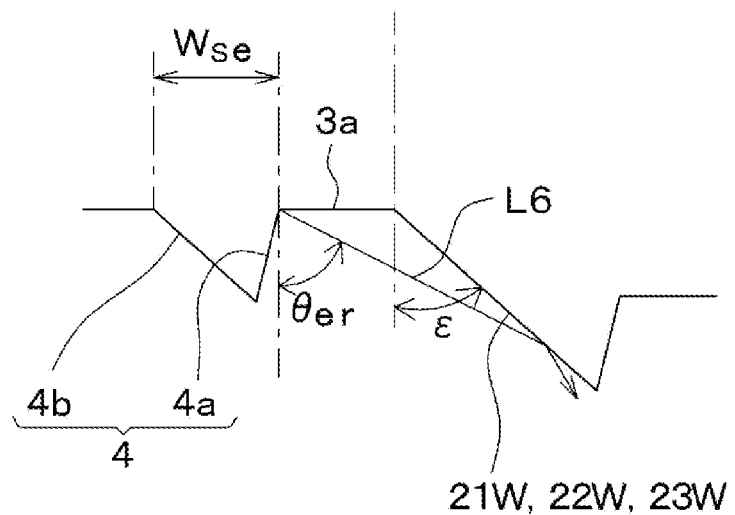
FIG. 8 is a diagram showing a comparison of the first embodiment and the second embodiment.

The following will describe a second embodiment of the present disclosure with reference to FIG. 7 and FIG. 8. In the second embodiment, the difference from first embodiment will be mainly described. In the blind spot display device 1 of the present embodiment, the inclined surface 21W, 22W, 23W and the end surface 2d are configured different from those of the first embodiment.

As shown in FIG. 7, each inclined surface 21W, 22W, 23W becomes close to the incidence surface 2a and becomes far from the end surface in a direction toward the display side (that is, toward the inside of the vehicle). More specifically, each inclined surface 21W, 22W, 23W is a translucent plane arranged parallel to the incidence surface 2a. The end face 2d is also a translucent plane arranged parallel to the incidence surface 2a.

Thus, each inclined surface 21W, 22W, 23W is parallel to the incidence surface 2a, and has translucency. With this configuration, the external environment light beam emitted from the adjacent transmission surface 4a, which is disposed close to the incidence surface 2a with respect to the inclined surface, is incident on the inclined surface at a near-perpendicular incidence angle without being reflected by the inclined surface. For example, among the external environment light beams L7, L8, L9 incident on the incidence surface 2a at angles different from those of the external environment light beams L1, L2, L3, the external environment light beams L8 and L9 enter the inclined surfaces 21W and 23W, respectively. Since each inclined surface 21W, 22W, 23W is parallel to the incidence surface 2a, the incidence angle is θ1+ψ. This incidence angle is the same as the incidence angle when the same external environment light beam is incident on the incidence surface 2a, that is, the acute angle θ1+ψ formed between the external environment light beam and the incidence surface 2a. The light beam that enters again from the inclined surface 21W, 22W, 23W passes through the light guide member 2e without being blocked. Then, the light beam is emitted from another transmission surface 4a, and reaches the occupant. This configuration can reduce a possibility that the external environment light beam transmitted from the incidence surface 2a is reflected by the inclined surface 21W, 22W, 23W, and travels in an unintended direction. The external environment light beam that enters the inclined surface 21W, 22W, 23W again and exit from the transmission surface 4a is parallel to the external environment light beam exit from another transmission surface 4a without passing through the inclined surface 21W, 22W, 23W. As a result, the light utilization efficiency can be improved.

The end surface 2d is parallel to the incidence surface 2a, and has translucency. The external environment light beam travels through the light guide member 2e, reflects on the exit surface 2b and the blind spot side reflecting surface 2c, and then reaches the end surface 2d. The external environment light beam reaching the end surface 2d passes through the end surface 2d toward the outside of the blind spot display device. Similar to the external environment light beam exit from the transmission surface 4a, the external environment light beam exit from the end surface 2d travels parallel to the external environment light beam that enters the incidence surface 2a. Thus, a viewing zone in which the external environment light beam can be visually recognized is further widened.

In the present embodiment, the light guide member 2e may be integrally molded, or may be configured by lamination molding. The light guide member 2e may be configured by molding multiple thin plates each of which having a planar surface intersecting with the flat portion normal direction and laminating the multiple thin plates in the protruding direction of the blind spot display device 1.

The following will describe proper use of the blind spot display device 1 according to the first embodiment and the blind spot display device 1 according to the second embodiment. In the blind spot display device 1 of the first embodiment, out of the external environment light beams emitted from the transmission surface 4a, the light beam, which is likely to be reflected in an unintended direction by the inclined surface 21W, 22W, 23W, is the external environment light beam that reaches outer side end of the eyellipse of the driver in the vehicle width direction (for example, right end in a right-hand drive vehicle). As shown in FIG. 8, the external environment light beam L6 exits from the adjacent transmission surface 4a, which is close to the incidence surface 2a, enters the inclined surface 21W, 22W, 23W, and then reaches the outer side end of the eyelipse in the vehicle width direction. The angle of the external environment light beam L6 exiting from the transmission surface 4a with respect to the protruding direction is set as θer. When the angle θer is larger than an inclined angle ε of the opposing surface 4b with respect to the protruding direction, there is a high possibility that the light beam L6 is highly possible to be reflected in an unintended direction by the inclined surface 21W, 22W, 23W. In such a case, the configuration of second embodiment may be applied.

In the present embodiment, for each incidence surface 21W, 22W, 23W, the prism portion 4 of the precedent step that is adjacent to the incidence surface 2a may have a width Wse greater than the widths of other prism portions 4 in the same precedent step. The widths of prism portions 4 are defined as lengths of the prism portions 4 in the direction perpendicular to the protruding direction of display side step. By increasing the width Wse, the external environment light beam incident from the inclined surface can reach the transmission surfaces 4a of the multiple prism portions 4 included in the subsequent step. As a result, the light utilization efficiency can be further improved.

(i) In the present embodiment, the external environment light beam passes through the inclined surface 21W, 22W, 23W that connects the precedent step (corresponding to a certain display side step) and the subsequent step (corresponding to a subsequent display side step). The external environment light beam passes through the prism portion 4 of the precedent step. Then, the external environment light beam enters the incidence surface 21W, 22W, 23W. The incidence surface 21W, 22W, 23W is inclined such that the incidence angle of the external environment light beam with respect to the inclined surface 21W, 22W, 23W is the same as the incidence angle θ1+ψ of the external environment light beam with respect to the incidence surface 2a.

The inclined surface 21W, 22W, 23W is inclined in the above-described manner. Thus, when the light, which has passes through the prism portion 4 of the precedent step toward the display side, enters the inclined surface 21W, 22W, 23W, the light is guided again through the light guide member 2e. Thus, interference (that is, vignetting) caused by reflection of external environment light beam on the slope 21W, 22W, 23W can be suppressed, and light utilization efficiency can be improved.

(ii) Each inclined surface 21W, 22W, 23W is parallel to the incidence surface 2a. Since the inclined surface is parallel to the incidence surface 2a, the angles satisfy the relationship described in the above (i).

In the present embodiment, the configuration of the blind spot display device 1, which is not described, may be configured the same as corresponding configuration of the blind spot display device 1 of the first embodiment. Thus, the same effect as the first embodiment can be obtained by the same configuration as the first embodiment. The configuration of end surface 2d in the present embodiment is also applicable to the first embodiment.

Third Embodiment

Figure 9:
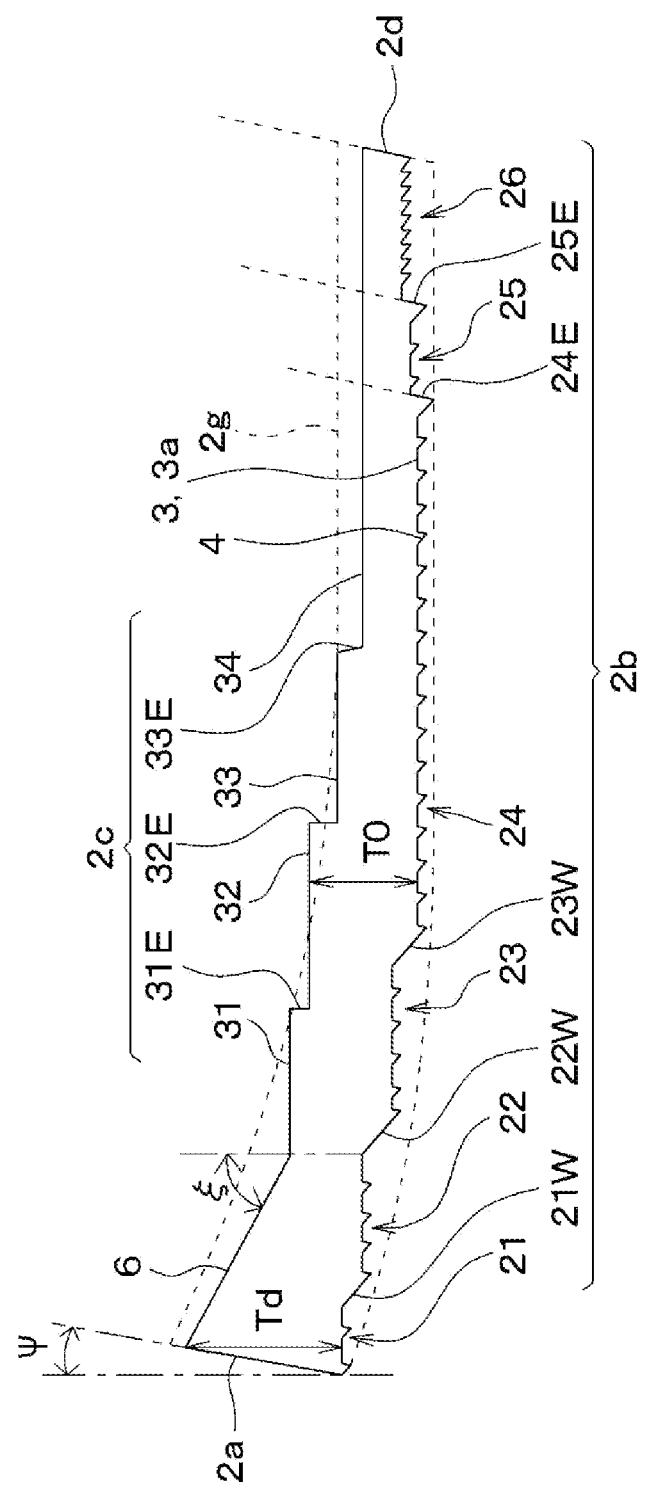
FIG. 9 is a cross-sectional view of a blind spot display device according to a third embodiment on the same cross section shown in FIG. 2.
Figure 10:
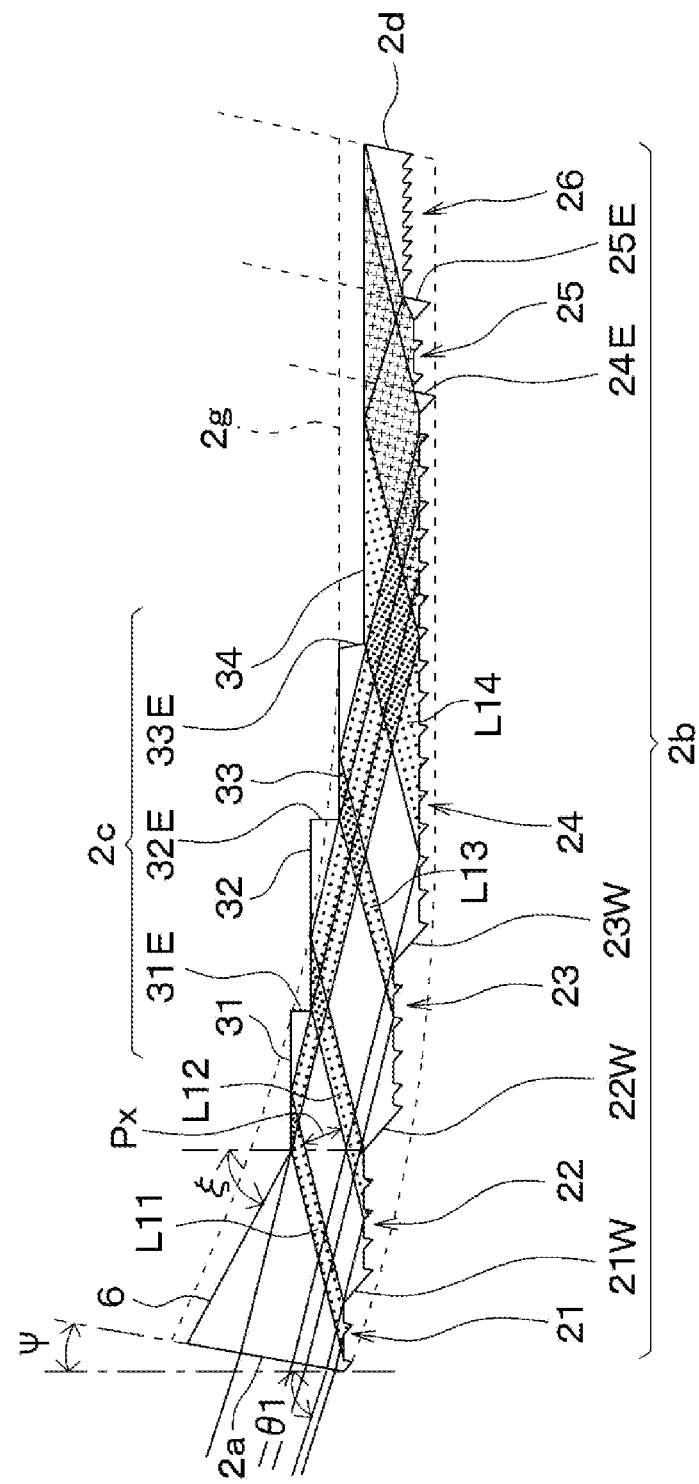
FIG. 10 is a diagram showing paths of external environment light beams on the cross section shown in FIG. 9.

The following will describe a third embodiment of the present disclosure with reference to FIG. 9 to FIG. 12. In the third embodiment, the difference from first embodiment will be mainly described. In FIG. 10, in order to illustrate the light guided in the light guide member 2e of the blind spot display device in an easy understanding manner, different patterns are applied to the passing areas of the external environment light beams L11, L12, L13, L14.

As shown in FIG. 9 and FIG. 10, the blind spot display device 1 of the present embodiment is different from the first embodiment in that the blind spot display device 1 includes an inclined surface 6 arranged between the incidence surface 2a and the blind spot side reflecting 2c. The inclined surface configures a part of the surface of the light guide member 2e. The inclined surface 6 protrudes from the blind spot side reflecting surface 2c toward the blind spot side. This difference will be mainly described in the present embodiment.

The maximum value of a distance between the blind spot side reflecting surface 2c and the flat portions 3a in the flat portion normal direction is defined as a height T0. The distance between an end portion of the incidence surface 2a adjacent to the inclined surface 6 and the flat portions 3a in the flat portion normal direction is defined as a height Td. The heights T0 and Td satisfy a relationship of Td>T0.

By providing the inclined surface 6, the area of the incidence surface 2a is increased compared with an area of the incidence surface 2a in the first embodiment. In this configuration, the area of the incidence surface 2a through which the external environment light beams enter the light guide member 2e is increased. Thus, an area of the external environment light beams firstly reaching the exit surface 2b is correspondingly increased. Thus, amount of external environment light beams guided by the light guide member 2e can be increased, and a gap of guided light beams can be reduced. The gap of guided light beams is an area in which the user cannot visually recognize the guided external environment light beam, and is also referred to as light beam gap. When the gap of guided light beams is generated, a continuity of external environment light beams, that is, a continuity of display on the exit surface 2b cannot be ensured to the user.

The inclined surface 6 is covered with a light absorption film (not shown) in order to suppress generation of ghost images caused by unintentional incidence of external environment light beams and reflection of the external environment light beams on the interface. Specifically, when a light beam with an angle smaller than the incidence angle θ1 is incident on the incidence surface 2a, part of the light beam reaches the inclined surface 6. The light absorbing film arranged on the inclined surface 6 absorbs the light reaching the inclined surface 6. Thus, unintended light beam, such as a light beam reflected on a portion different from the blind spot side reflecting surface 2c is prevented from being directed toward the exit surface 2b, thereby suppressing generation of ghost images.

As shown in FIG. 9 and FIG. 10, the inclined surface 6 has a linear shape, and connects an end of the incidence surface 2a and an end of the blind spot side reflecting surface 2c. The inclined surface 6 is designed such that an inclination angle with respect to the flat portion normal direction does not cause the light beam gap in the guided external environment light beam L1, which enters from the incidence surface 2a.

Figure 11:
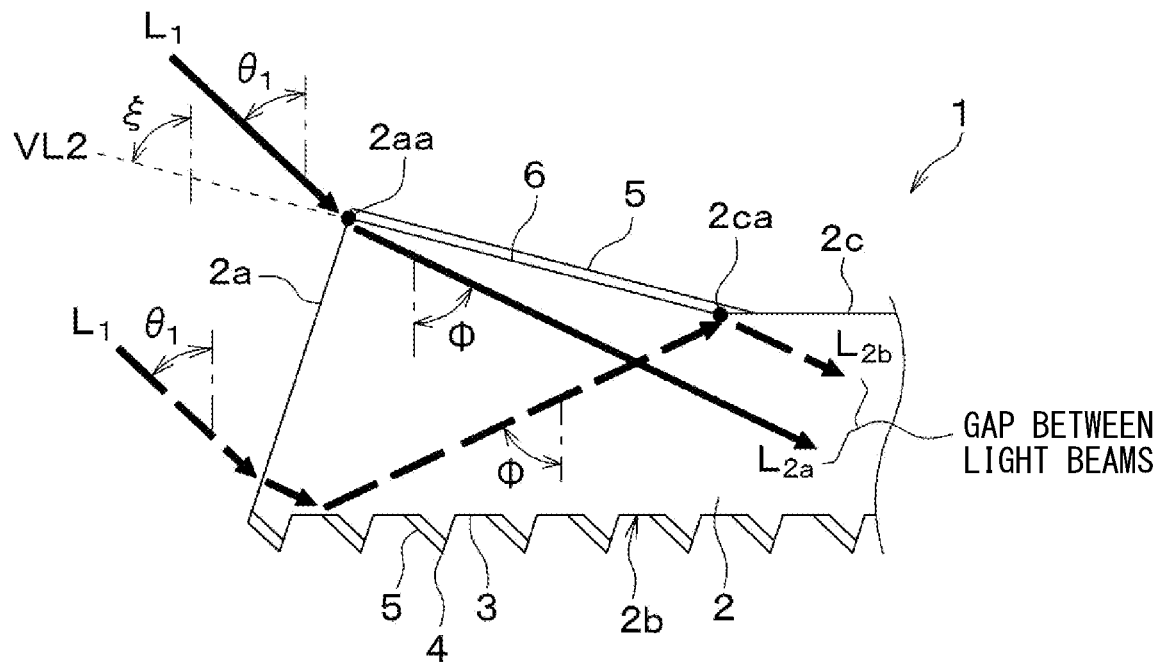
FIG. 11 is an explanatory diagram for explaining a relationship between an angle of an inclined surface and a gap between light beams.

For example, as shown in FIG. 11, when the inclination angle of the inclined surface 6 is larger than the light guide angle φ of the external environment light beam L1, a gap may occur between the light beams.

The following describes specific examples. Hereinafter, for convenience of explanation, an end portion of the incidence surface 2a adjacent to the blind spot side reflecting surface 2c is referred to as a first end portion 2aa, and an external environment light beam incident from a point adjacent to the first end portion 2aa is referred to as an incidence light beam L2a. An end portion of the blind spot side reflecting surface 2c adjacent to the incidence surface 2a is referred to as a second end portion 2ca, and an external environment light beam reflected at a point adjacent to the second end portion 2ca is referred to as an incidence light beam L2b.

When the inclination angle ξ of the inclined surface 6 is greater than the light guide angle φ, a gap is generated between the incidence light beam L2a passing through a point distant from the second end portion 2ca and the incidence light beam L2b reflected at a point adjacent to the second end portion 2ca. The gap between the incidence light L2a and the incidence light L2b is the light beam gap. When the light beam gap occurs, the external environment light beams do not reach a part of the prism portions 4 included in the exit surface 2b. In this case, a gap occurs in the guided light beams, and the continuity of display cannot be ensured.

Figure 12:
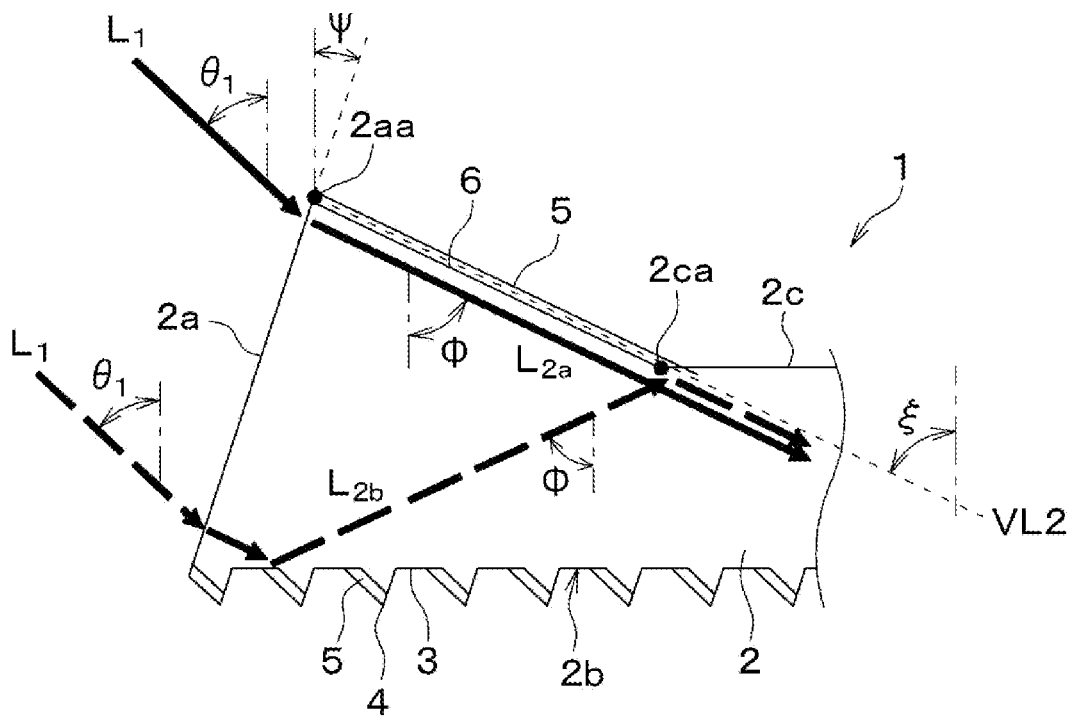
FIG. 12 is a diagram showing suppression of the gap between light beams by adjusting the angle of the inclined surface.

With consideration of above point, the inclined surface 6 is configured such that the inclination angle ξ of inclined surface 6 is smaller than the light guide angle φ. In this case, as shown in FIG. 12, the incidence light L2a passes through a point adjacent to the second end portion 2ca, and no gap is generated between the incidence light L2a and the incidence light L2b. As a result, the light guide member 2e does not have a gap between the light beams, and also does not have a gap between the guided light beams. Thus, blind spot display device 1 can ensure the continuity of display on the exit surface 2b.

When the incidence angle θ1 of the external environment light beam L1 is within a range of θ1±Δθ1 and the light guide angle ϕ of the incidence light beam L2a, L2b is within a range of ϕ±Δϕ, the inclination angle ξ of the inclined surface 6 is configured to satisfy a relationship ξ<ϕ−Δϕ such that the generation of light beam gaps is restricted within the incidence angle range of θ1±Δθ1.

The incidence surface 2a may have an inclination angle ψ smaller than π/2−θ1. When the incidence surface 2a, which is the refracting surface of the external environment light beam L1, satisfies a relationship ψ<π/2−θ1, the light guide angle ϕ of incidence light beam L2a, L2b after refracting becomes larger than the incidence angle θ1 of the external environment light beam L1. As a result, in the light guide member 2e, an initial arrival width of the incidence light beams L2a, L2b becomes wide. Compared with a case where the light guide angle is θ1, the light guide width, that is, the height T0 of the blind spot side reflecting surface 2c can be decreased to have a compact size.

The following will describe a configuration of the blind spot display device 1 other than the inclined surface 6, which is different from the first embodiment. As in the first embodiment, the exit surface 2b of the present embodiment has a stepped shape to include multiple display side steps as a whole. Specifically, the exit surface includes the display side steps 21, 22, 23, 24, 25, 26 similar to those of the first embodiment, and the display side step 27 of the first embodiment is eliminated in the present embodiment. The exit surface 2b of the present embodiment includes the inclined surfaces 21W, 22W, 23W, 24E, 25E similar to those of the first embodiment, and the inclined surface 26E of the first embodiment is eliminated in the present embodiment.

The blind spot side reflecting surface 2c of the present embodiment has a stepped shape, and includes multiple steps so that the blind spot side reflecting surface 2c is arranged in a three-dimensional manner not along a plane. Each of the multiple steps included in the blind spot side reflecting surface 2c is referred to as a blind spot side step, and protrudes toward the blind spot side. Each blind spot side step corresponds to a second step. The position of each blind spot side step in the protruding direction is different from one another.

On the blind spot side reflecting surface 2c, the multiple blind spot side steps 31, 32, 33, 34 are arranged in a direction from a side close to the incidence surface 2a to a side far from the incidence surface 2a. The blind spot side steps 31 to 34 are parallel to one another in the protruding direction. The blind spot side reflecting surface 2c includes blind spot side connection surfaces 31E, 32E, 33E each of which is arranged between adjacent two blind spot side steps 31 to 34. The blind spot side connection surfaces are also referred to as connection surfaces.

The blind spot side step 32 is recessed toward the display side more than the blind spot side step 31, the blind spot side step 33 is recessed toward the display side more than the blind spot side step 32, and the blind spot side step 34 is recessed toward the display side more than the blind spot side step 33. Thus, the blind spot side connection surface 31E, 32E, 33E faces the end surface 2d rather than the incidence surface 2a. The blind spot side steps 31 to 34 and the blind spot side connection surfaces 31E, 32E, 33E configure a pseudo curved surface 2g. The pseudo curved surface 2g is approximately configured by the blind spot side steps 31 to 34 and the blind spot side connection surfaces 31E, 32E, 33E.

Since the positions of blind spot side steps 31 to 34 are different from one another in the protruding direction, the blind spot side reflecting surface 2c, as a whole, has a three-dimensional arrangement not along a plane. Note that the term "not along a plane" excludes a case where the arrangement is shifted from the planar arrangement by an unavoidable processing error. For example, the term "not along a plane" means that, when the shortest distance from the position of each blind spot side step 31, 32, 33, 34 to a certain reference plane P is d, the reference plane P is defined such that a sum of the shortest distances d of all of the blind spot side steps 31, 32, 33, 34 is minimized. In such a case, when an average value d of the shortest distances d of all of the blind spot side steps is 5% or more of the longest distance Y of the blind spot side reflecting surface 2c, the blind spot side reflecting surface 2c is deemed to be arranged in a three-dimensional manner not along a plane as whole. Here, the longest distance Y is the distance between the two most distant points on the blind spot side reflecting surface 2c.

Due to the shapes of the blind spot side reflecting surface 2c and the end surface 2d, the light guide member 2e, as a whole, has a meniscus shape in which the blind spot side surface has a shape approximated to the pseudo-curved surface 2g and the display side surface has a shape approximated to the pseudo-curved surface 2f. This shape of light guide member 2e reduces a possibility of physical interference between the front pillar 92 and the blind spot display device 1. Thus, attaching of the blind spot display device 1 to a target object, such as the front pillar can be eased.

Similar to the exit surface 2b in the first embodiment, each blind spot side step 31, 32, 33, 34 performs total reflection to the external environment light beam, which is incident from the incidence surface 2a and is totally reflected by the flat portion 3a. The blind spot side connection surface 31E, 32E, 33E may have a light shielding property by arranging a light absorbing film (not shown) on the blind spot side connection surface by performing light shielding treatment. With this configuration, the external environment light beam traveling through the light guide member 2e is prevented from passing through the blind spot side connection surface 31E, 32E, 33E, being reflected on the front pillar 92, and then entering the light guide member 2e again. Thus, it is possible to reduce the ghost caused by the reflection of light beams on the front pillar 92. Alternatively, the blind spot side connection surface 31E, 32E, 33E may not have a light shielding property, and allows the light beam to pass through the blind spot side connection surface. In this case, when the members configuring the front pillar 92 has a light shielding property at a portion facing the blind spot side connection surface 31E, 32E, 33E, the same effect can be achieved as a case where the blind spot side connection surface 31E, 32E, 33E has the light shielding property.

The following will describe positions of the blind spot side connection surfaces 31E, 32E, 33E. As shown in FIG. 9 and FIG. 10, the blind spot side connection surfaces 31E, 32E, 33E are positioned farther from the incidence surface 2a compared with the inclined surface 21W. With this configuration, the blind spot side connection surfaces 31E, 32E, 33E can reduce the gap in the guided light beams. Herein, the gap in the guided light beams is generated by the inclined surface 21W, 22W, 23W which have a stepped shape. For example, as shown in FIG. 10, the external environment light beams L11, L12 are reflected by the display side steps 21, 22, respectively, and reflected again respectively by the blind spot side steps 31, 32. When the light beams are reflected by the display side steps 21, 22, a gap Px is generated between the external environment light beam L11 and the external environment light beam L12. The gap is reduced (for example, completely canceled) by a height difference between the blind spot side step 31 and the blind spot side step 32, and then the external environment light beams L11 and L12 are guided to the next display side step. For achieving the above-described purpose, among the multiple inclined surfaces 21W, 22W, 23W, at least the inclined surface 21W closest to the incidence surface 2a is positioned closer to the incidence surface 2a compared with all of the blind spot side connection surfaces 31E, 32E, 33E.

As shown in FIG. 10, out of the external environment light beams incident at the incidence angle θ1 on the incidence surface 2a, the external environment light beam L11 is totally reflected by the flat portion 3a of the display side step 21 first, then travels through the light guide member 2e. After that, the external environment light beam L11 is further totally reflected by the blind spot side step 31. The external environment light beam L11 totally reflected on the blind spot side step 31 deviates from the blind spot side connection surface 31E, and reaches the display side step 24 without hitting the blind spot side connecting surface 31E. That is, the blind spot side connection surface 31E is arranged at a position such that the blind spot side connection surface 31E does not block the external environment light beam L11.

Among the external environment light beams incident at the incidence angle θ1 on the incidence surface 2a, the external environment light beam L12 is totally reflected by the flat portion 3a of the display side step 22 at first, travels through the light guide member 2e, and then reaches the blind spot side step 32. The external environment light beam L12 is totally reflected on the blind spot side step 32, and then reaches the display side step 24. The external environment light beam L12 reaches the blind spot side step 32 without hitting the blind spot side connecting surface 31E.

The blind spot side connection surface 31E is positioned such that the external environment light beam L11, which is reflected by the blind spot side step 31, reaches the display side step 24 without being blocked by the blind spot side connection surface 31E. The blind spot side connection surface is positioned such that all of the external environment light beam L12 reaches the blind spot side step 32 without being blocked by the blind spot side connection surface 31E. That is, the blind spot side connection surface 31E is arranged in a non-passing area of light beam through which neither the external environment light beam L11 nor the external environment light beam L12 passes.

When the blind spot side connection surface 31E is not positioned as described above, one or both of the external environment light beam L11 and the external environment light beam L12 are blocked by the blind spot side connection surface 31E. As a result, the gap generated between the guided external environment light beams L1 and L2 is increased when the external environment light beams L1 and L2 are emitted toward outside from the transmission surface 4a of the display side step 24.

By arranging the blind spot side connection surface 31E in the non-passing area of light beam, through which neither the external environment light beam L11 nor the external environment light beam L12 passes, a gap between the external environment light beam L1 and the external environment light beam L2 is reduced when the external environment light beams L11 and L12 are emitted toward outside from the transmission surface 4a of the display side step 24. Thus, unevenness in the brightness in the image viewed by the driver can be suppressed. The same applies to the blind spot side connection surfaces 32E and 33E.

As shown in FIG. 9 and FIG. 10, in the display side step 26 closest to the end face 2d, the flat portion 3a is not arranged, and multiple prism portions 4 are arranged adjacently and continuously. When the external environment light beam is totally reflected on the display side step 24 closest to the end face 2d, the reflected light beam will hit the end face 2d and generates unnecessary light beam. By arranging the prism portions 4 adjacently and continuously on the display side step 24 closest to the end surface 2d, amount of the external environment light beams emitted from the transmission surfaces 4a of the prism portions 4 toward the display side is increased, thereby increasing the light utilization efficiency and restricting generation of unnecessary light.

Two adjacent display side steps configure a pair of display side steps. In this pair, the display side step close to the driver (that is, farther from the incidence surface 2a) is positioned on inner side in the vehicle width direction (that is, the display side in the flat portion normal direction) than the other display side step. This pair of display side steps is also referred to as a display side step pair. The configuration of the present embodiment includes multiple display side step pairs, that is, the pair including the display side step 21 and the display side step 22, the pair including the display side step 22 and the display side step 23, and the pair including the display side step 23 and the display side step 24.

Two adjacent blind spot side steps configure a pair of blind spot side steps. In this pair, the blind spot side step close to the driver (that is, farther from the incidence surface 2a) is positioned on inner side in the vehicle width direction (that is, the display side in the flat portion normal direction) than the other blind spot side step. This pair of blind spot side steps is also referred to as a blind spot side step pair. The configuration of the present embodiment includes multiple blind spot side step pairs, that is, the pair including the blind spot side step 31 and the blind spot side step 32, the pair including the blind spot side step 32 and the blind spot side step 33, and the pair including the blind spot side step 33 and the blind spot side step 34.

In the present embodiment, the number of display side step pairs is equal to the number of blind spot side step pairs. When the number of the display side step pairs is larger than the number of the blind side step pairs, the gap generated between adjacent external environment light beams totally reflected and guided by the light guide member is increased. The gap is visually recognized by the driver as unevenness in the brightness. Thus, when the gap generated between adjacent external environment light beams totally reflected and guided by the light guide member is increased, the unevenness in the brightness of the external environment light beams is increased. When the number of display side step pairs is smaller than the number of blind spot side step pairs, the amount of unnecessary light, which is generated when the external environment light beams enter the blind spot side connection surface, is increased. Herein the blind spot side connection surface corresponds to the height difference between two adjacent blind side steps. As a result, the light utilization efficiency is decreased. When the number of display side step pairs is set to be equal to the number of blind spot side step pairs, unevenness in brightness is reduced and the light utilization efficiency is improved, compared with a case where the number of display side step pairs is set to be different from the number of blind spot side step pairs.

(i) As described above, the blind spot side reflecting surface 2c of the present embodiment has a stepped shape, and includes multiple blind spot side steps 31, 32, 33, 34 so that the blind spot side reflecting surface 2c is arranged in a three-dimensional manner not along a plane. This shape of the blind spot side reflecting surface reduces a possibility of physical interference between the front pillar 92 and the blind spot display device 1. The front pillar 92 is the target object to which the blind spot display device 1 is attached.

(ii) The blind spot display device 1 has multiple blind spot side connection surfaces 31E, 32E, 33E each of which connects two adjacent blind spot side steps 31, 32, 33, 34. Compared to the inclined surface 21W connecting the display side step 21 most closest to the incidence surface 2a and the display side step 22 secondly closest to incidence surface 2a, the blind spot side connection surfaces 31E, 32E, 33E are positioned farther from the incidence surface 2a. With this configuration, the blind spot side connection surfaces 31E, 32E, 33E can reduce the gap generated in the guided light beams. As described above, the gap in the guided light beams is generated by the inclined surface 21W, 22W, 23W having a stepped shape.

(iii) In the present embodiment, the number of display side step pairs is equal to the number of blind spot side step pairs. With this configuration, unevenness in brightness is reduced and the light utilization efficiency is improved compared with a case where the number of display side step pairs is set to be different from the number of blind spot side step pairs.

In the present embodiment, the configuration of the blind spot display device 1, which is not described, may be configured the same as corresponding configuration of the blind spot display device 1 of the first embodiment. In the present embodiment, the same effect as the first embodiment can be obtained by the same configuration as the first embodiment. In the present embodiment, it is also possible to apply the same change as the change, which is made in the second embodiment with respect to the first embodiment.

Fourth Embodiment

Figure 13:
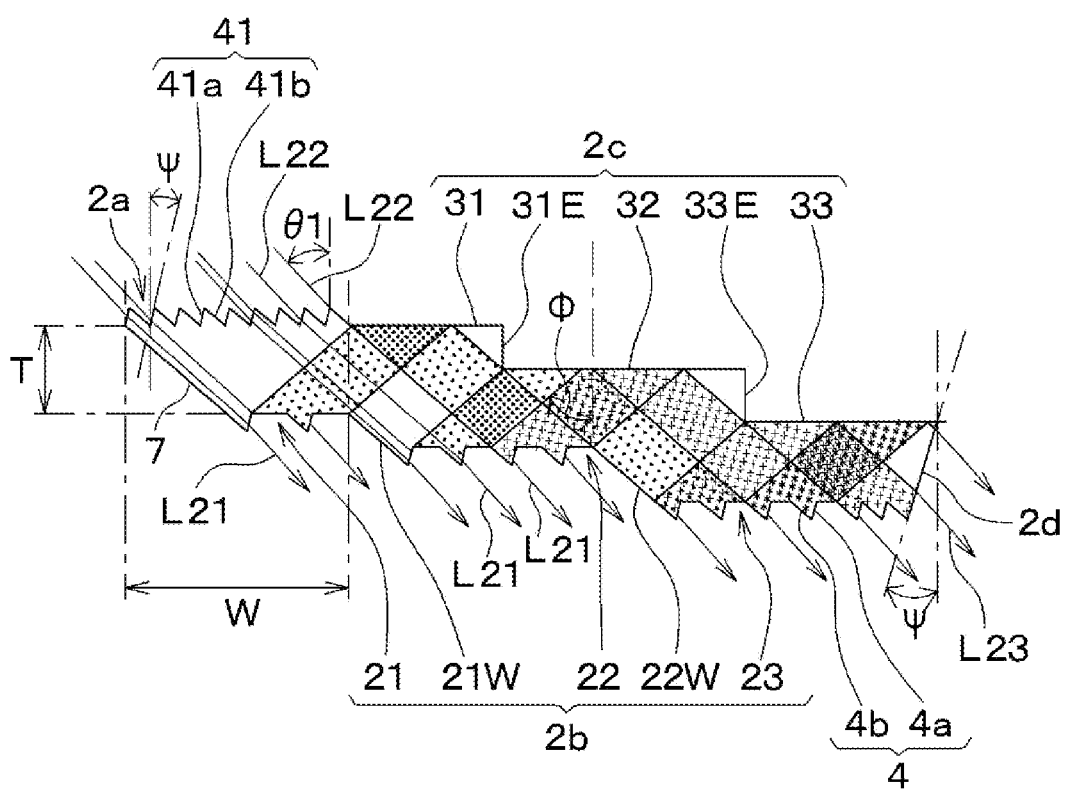
FIG. 13 is a cross-sectional view of a blind spot display device according to a fourth embodiment on the same cross section shown in FIG. 9.

The following will describe a fourth embodiment of the present disclosure with reference to FIG. 13 to FIG. 17. In the fourth embodiment, the difference from third embodiment will be mainly described. As shown in FIG. 13, compared with the blind spot display device 1 according to the third embodiment, the blind spot display device 1 of the present embodiment does not have the inclined surface 6, and a position of the incidence surface 2a is different from that of the third embodiment. Further, the blind spot display device 1 according to the present embodiment further includes an inclined surface 7 compared with the third embodiment. In the exit surface 2b, the inclined surface 23W and the display side step 24 are eliminated. In the blind spot side reflecting surface 2c, the blind spot side connecting surface 33E and the blind spot side step 34 are eliminated.

A distance T from the flat portion 3a of the display side step 21 to the blind spot side step 31 along the flat portion normal direction is the same as a distance from the flat portion 3a of the display side step 22 to the blind spot side step 32 along the flat portion normal direction. The distance T from the flat portion 3a of the display side step 21 to the blind spot side step 31 along the flat portion normal direction is the same as a distance from the flat portion 3a of the display side step 23 to the blind spot side step 33 along the flat portion normal direction.

A light absorption film (not shown) may be arranged on the inclined surface 7 by applying light shielding treatment. Thus, it is possible to suppress the incidence and emission of unnecessary light.

The incidence surface 2a of the present embodiment is arranged parallel to the exit surface 2b and the blind spot side reflecting surface 2c. The incidence surface 2a is arranged distant from the exit surface 2b. One end of the incidence surface 2a is connected to an end of the blind spot side reflecting surface 2c without a step, that is, a height difference. The other end of the incidence surface 2a is connected to an end of the inclined surface 7. The other end of the inclined surface 7, which is opposite to the incidence surface 2a, is connected to the exit surface 2b. The incidence surface 2a is arranged to be opposed to the display side step 21 of the exit surface 2b.

The incidence surface 2a has multiple incidence prism portions 41 arranged continuously adjacent to one other from the end of the incidence surface 2a, which is disposed close to the inclined surface 7 (that is, the end of the incidence surface adjacent to the windshield 94), toward the end surface 2d.

Each of the incidence prism portions 41 includes an incidence transmission surface 41a and an opposing surface 41b. Each of the incidence transmission surface 41a and the opposing surface 41b protrudes toward the blind spot side, and has translucency. In each incidence prism portion 41, the incidence transmission surface 41a is arranged away from the end surface 2d compared with the opposing surface 41b. That is, in each incidence prism portion, the opposing surface 41b is arranged close to the end surface 2d compared with the incidence transmission surface 41a.

Each incidence transmission surface 41a is arranged parallel to the transmission surface 4a of each prism portion 4 included in the display side reflecting surface. That is, an inclination angle ψ, which is an acute angle formed between the flat portion normal direction and the incidence transmission surface 41a, is the same as an inclination angle ψ, which is an acute angle formed between the flat portion normal direction and the transmission surface 4a. Thus, when the external environment light beam incident on the incidence transmission surface 41a is finally emitted from the transmission surface 4a, the external environment light beam incident on the incidence transmission surface 41a is parallel to the external environment light beam emitted from the transmission surface 4a.

A light absorption film (not shown) may be arranged on each opposing surface 41b by applying light shielding treatment. Thus, it is possible to suppress the incidence and emission of unnecessary light that passes through the opposing surface 41b.

The following will describe reasons of the above-described arrangement of incidence surface 2a. As shown in FIG. 13, the external environment light beams L21, L22, L23 pass through the light guide member 2e after entering from the incidence surface 2a. In FIG. 13, in order to illustrate the light guided in the light guide member 2e in an easy understanding manner, different patterns are applied to the passing areas of the external environment light beams L21, L22, L23.

After entering the incidence surface 2a, the external environment light beam L21 is emitted through the transmission surface 4a of the display side step 21 or through the transmission surface 4a of the display side step 22 without being reflected by the flat portion 3a even once. An arrangement direction of the incidence transmission surfaces 41a of the incidence prism portions 41 is parallel to an arrangement direction of the transmission surfaces 4a of the display side step 21. Thus, the external environment light beams L21, which are incident on different incidence transmission surfaces 41a, have the same optical length from incidence on the incidence surface 2a to the exit. Herein, the term "exit" indicates that the light beam reaches a plane which is perpendicular to the flat portion normal direction and positioned close to the user compared with the exit surface 2b.

The external environment light beam L22 is reflected by the flat portion 3a only once after entering the incidence surface 2a, and further reflected by the blind spot side step 31 or the blind spot side step 32, only once. Then, the external environment light beam L22 reaches the display side step 22 or the display side step 23, then emits toward outside through the transmission surface 4a of the display side step 22 or 23. When the external scene light L22 is reflected by the flat portion 3a of the display side step 21, the external environment light beam L22 is then reflected by the blind spot side step 31. When the external environment light beam L22 is reflected by the flat portion 3a of the display side step 22, the external environment light beam is then reflected by the blind spot side step 32. As described above, the distance from the flat portion 3a of the display side step 21 to the blind spot side step 31 along the flat portion normal direction is the same as the distance from the flat portion 3a of the display side step 22 to the blind spot side step 32 along the flat portion normal direction. Thus, the external environment light beams L22, which are incident on different incidence transmission surfaces 41a, have the same optical length from incidence on the incidence surface 2a to the exit.

The external environment light beam L23 is reflected by the flat portion 3a twice in total after entering the incidence surface 2a, and further reflected by the blind spot side step twice in total. The first reflection on the blind spot side step may be a reflection on the blind spot side step 31 or 32, and the second reflection on the blind spot side step may be a reflection on the blind spot side step 32 or 33. Then, the external environment light beam L23 reaches the display side step 22 or the display side step 23, then emits toward outside through the transmission surface 4a of the display side step 22 or 23. When the external scene light L23 is reflected by the flat portion 3a of the display side step 21, the eternal environment light beam L23 is then reflected by the blind spot side step 31. When the external environment light beam L23 is reflected by the flat portion 3a of the display side step 22, the external environment light beam L23 is then reflected by the blind spot side step 32. When the external environment light beam L23 is reflected by the flat portion 3a of the display side step 23, the external environment light beam L23 is then reflected by the blind spot side step 33. As described above, the distance from the flat portion 3a of the display side step 21 to the blind spot side step 31 along the flat portion normal direction is the same as the distance from the flat portion 3a of the display side step 22 to the blind spot side step 32 along the flat portion normal direction. The distance from the flat portion 3a of the display side step 21 to the blind spot side step 31 along the flat portion normal direction is the same as the distance from the flat portion 3a of the display side step 23 to the blind spot side step 33 along the flat portion normal direction. Thus, the external environment light beams L23, which are incident on different incidence transmission surfaces 41a, have the same optical length from incidence on the incidence surface 2a to the exit.

The optical path length of the external environment light beam L21 from the incidence surface 2a to the exit, the optical path length of the external environment light beam L22 from the incidence surface 2a to the exit, and the optical path length of the external environment light beam L23 from the incidence surface 2a to the exit are different from one another.

On the exit surface 2b, in each of a relatively wide range from which the external environment light beam L21 is emitted, a relatively wide range from which the external environment light beam L22 is emitted, and a relatively wide range from which the external environment light beam L23 is emitted, the optical path length becomes constant. Thus, a distortion in the external environment image, which is visually recognized by the emitted light beams, can be roughly divided into a first boundary region and a second boundary region. The first boundary region is a region between the range from which the external environment light beam L21 is emitted and the range from which the external environment light beam L22 is emitted. The second boundary region is a region between the range from which the external environment light beam L22 is emitted and the range from which the external environment light beam L23 is emitted.

Within the range from which the external environment light beam L21 is emitted, when the optical path length of the external environment light beam L21 changes according to the distance from the incidence surface 2a to the transmission surface 4a, suppose that the external environment light beam enters the incidence surface 2a of the blind spot display device 1 in a direction angled with the horizontal plane of the vehicle. In this case, the external environment light beams L21 which has the same positions in the up to down direction of the vehicle when entering the incidence surface 2a have different positions on a plane perpendicular to the flat portion normal direction in the up to down direction of the vehicle. The plane perpendicular to the flat portion normal direction is a plane defined at a position close to the driver compared with the exit surface 2b. As a result, distortion of the external environment light beams may occur. For example, when the external environment light beams L21 are transmitted from infinitely far position as described above, the arrival positions of the external environment light beams L21 in the up to down direction of the vehicle depends on the optical path length difference caused by the blind spot display device 1. Suppose that the positions of the external environment light beams entering the incidence surface 2a change when the external environment light beams arrive at the eyellipse EL. With the configuration in which an angular relationship between the incidence surface 2a and the transmission surface 4a is maintained the same at each position in the up to down direction of the vehicle, the external environment light beams L21 will not be distorted even though the optical path lengths of the external environment light beams are different. This is because the external environment light beams L21 are incident on the incidence surface 2a as parallel light beams. When the external environment light beams L21 are transmitted from a finite distance, even though the positions of the external environment light beams in the up to down direction of the vehicle are the same at the time of entering incidence surface 2a, the positions of external environment light beams may change to be different when the light beams reach the eyellipse EL of each of both eyes. Since the positions of the external environment light beams are shifted in the up to down direction of the vehicle, a distortion of the external environment light beams L21 is occurred. When a person views a certain fixed point, when there is a parallax in a straight line connecting the left eye and the right eye, the image generation is achieved by adjusting a convergence angle of the left and right eyes. The straight line direction generally coincides with the horizontal direction of the vehicle in most of cases. In a case where the parallax exists in the up to down direction of the vehicle, it is difficult to adjust the convergence angle of the left and right eyes, and visibility tends to deteriorate due to the above-described distortion of the external environment light beams L21. This is an example in which the posture of the blind spot display device 1 is determined so that the flat portion normal direction and the normal direction of the incidence surface 2a are parallel to the horizontal plane of the vehicle.

The following will describe an example in which a posture of the blind spot display device 1 is rotated by an angle equal to or greater than 0 degree and less than 90 degrees around the flat portion normal direction as an axis. That is, an example in which the blind spot display device 1 is inclined will be described. In this configuration, suppose that the external environment light beam L21 enters the incidence surface 2a in the horizontal direction of the vehicle. In such an example, within the range from which the external environment light beam L21 is emitted, when the optical path length of the external environment light beam L21 changes according to the distance from the incidence surface 2a to the transmission surface 4a, the external environment light beam L21 that has entered the incidence surface 2a emits from the transmission surface 4a in the horizontal direction of the vehicle in a configuration where the incidence surface 2a is parallel to the transmission surface 4a. As described above, the blind spot display device 1 is placed in inclined manner. Thus, a shift occurs in the up to down direction of the vehicle due to refraction of the external environment light beam L21 on the incidence surface 2a. That is, the position of the external environment light beam L21 in the up to down direction of the vehicle when the external environment light beam L21 emits through the transmission surface 4a is shifted from the position of the external environment light beam L21 in the up to down direction of the vehicle when the external environment light beam L21 enters the incidence surface 2a. The position shift amount increases as the optical path length increases. Within the range from which the external environment light beam L21 is emitted, when the optical path length changes, distortion of the external environment light beam L21, that is, parallax in the up to down direction of the vehicle occurs. As described in the present embodiment, within the range from which the external environment light beam L21 is emitted, the optical path length is constant regardless of the distance from the incidence surface 2a to the transmission surface 4a, the parallax of the external environment light beam incident on the incidence surface can be reduced in the up to down direction of the vehicle.

In the display side step 23, the prism portions 4 and the flat portions 3a are alternately arranged within the range from which the external environment light beam L22 is emitted. Within the range from which the external environment light beam L23 is emitted, only the multiple prism portions 4 are continuously arranged without the flat portion 3a. This is because, within the range from which the external environment light beam L23 is emitted, the light utilization efficiency can be increased by emitting all of the external environment light beam L23 through the transmission surface 4a without reflection.

The width W in the alignment direction of the incidence prism portions 41 (that is, prism array) arranged on the incidence surface 2a is equal to or slightly different from a value obtained by an expression $2T \times \tan \phi$. For example, the width W may be within an error range of ±5% with respect to the value obtained by the expression $2T \times \tan \phi$. Here, $\phi$ is the light guide angle of the external environment light beam incident at the incidence angle of $\theta 1$.

Figure 14:
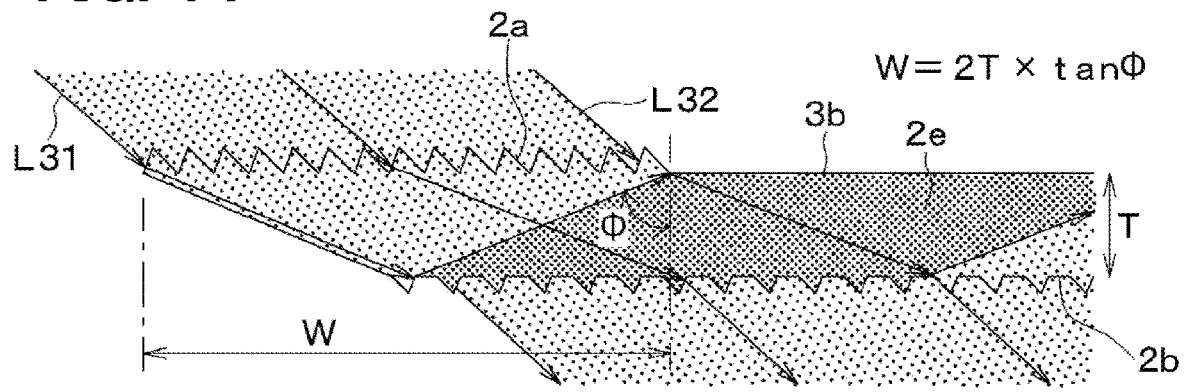
FIG. 14 is an explanatory diagram for explaining a relationship between a width of an incidence surface and a gap between light beams.

The reason will be described with reference to FIG. 14, FIG. 15, and FIG. 16. In FIG. 13, in order to illustrate the light guided in the light guide member 2e in an easy understanding manner, patterns are applied to the passing areas of the external environment light beams. FIG. 14 shows the optical path of external environment light beam when $W=2T \times \tan \phi$. In this case, the external environment light beam L31 incident from the incidence transmission surface 41a of the incidence surface 2a, which is closest to the windshield 94 (that is, the side farthest from the end face 2d), is reflected by the flat portion 3a of the display side step 21, which is closest to the windshield 94 of the vehicle. The external environment light beam L31 is further reflected by the blind spot side step 31 closest to the windshield 94, and travels toward the transmission surface 4a of the blind spot side step 31 or the transmission surface 4a of the blind spot side step 32. The external environment light beam L32 enters the incidence transmission surface 41a of the incidence surface 2a, which is farthest from the windshield 94 (that is, closest to the end surface 2d), and then travels toward the transmission surface 4a of the blind spot side step 31 or the transmission surface 4a of the blind spot side step 32. In this case, there is almost no gap between the external environment light beam L31 and the external environment light beam L32. That is, an unevenness in brightness of the external environment light beams can be reduced.

Figure 15:
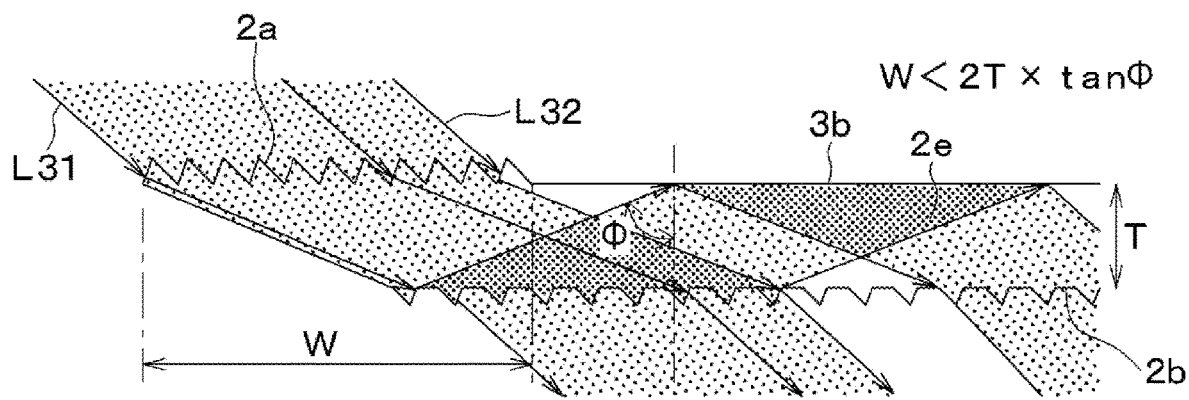
FIG. 15 is an explanatory diagram for explaining a relationship between a width of an incidence surface and a gap between light beams.

FIG. 15 shows the optical path of external environment light beam when the width W is smaller than the value obtained by the expression $2T \times \tan \phi$. In this case, the gap between the external environment light beam L32 and the external environment light beam L31 is increased, that is, the unevenness in brightness of the external environment light beams is increased.

Figure 16:
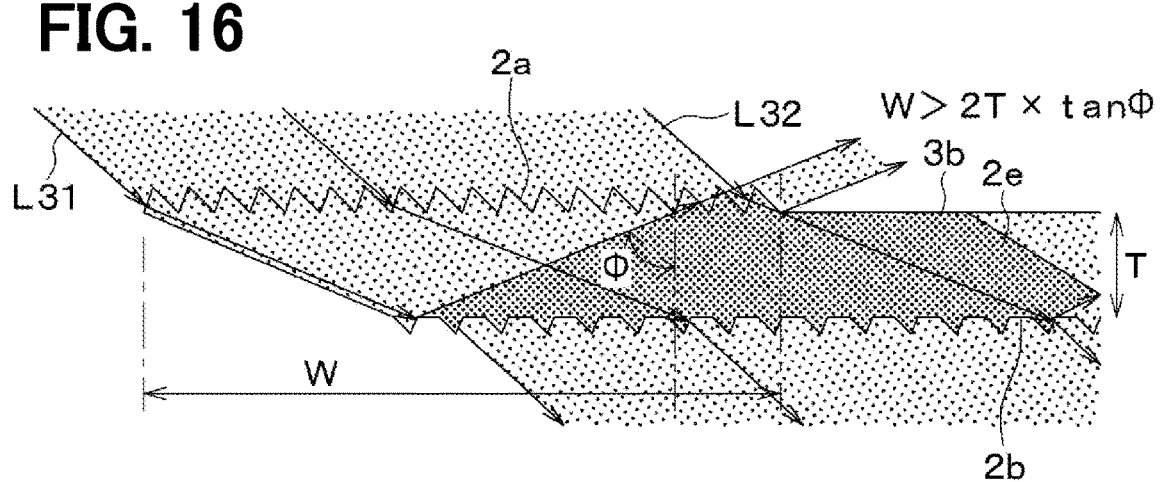
FIG. 16 is an explanatory diagram for explaining a relationship between a width of an incidence surface and a gap between light beams.

FIG. 16 shows the optical path of external environment light beam when the width W is greater than the value obtained by the expression $2T \times \tan \phi$. In this case, the external environment light beam L31 incident from the incidence transmission surface 41a of the incidence surface 2a, which is closest to the windshield 94, is reflected by the flat portion 3a of the display side step 21, which is closest to the windshield 94 of the vehicle. Then, the reflected light beam hits the opposing surface 41b of the incidence surface 2a. When the opposing surface 41b has light translucency, the external environment light beam L31 is emitted toward outside through the light guide member 2e. When the opposing surface 41b has a light shielding property, the external environment light beam L31 is blocked by the opposing surface 41b. That is, a loss of external environment light beam is occurred. As shown in FIG. 16, when the width W is larger than the value obtained by the expression $2T \times \tan \phi$, there is almost no gap between the external environment light beams. Thus, if loss of the external environment light beam is acceptable, a range of the width W may be set to be $W \geq 2T \times \tan \phi$. With this setting of the width W, the unevenness in brightness can be reduced.

The configuration of the present embodiment includes two display side step pairs, that is, the pair including the display side step 21 and the display side step 22 and the pair including the display side step 22 and the display side step 23. These two display side step pairs are the same as part of the display side step pairs described in the third embodiment. The configuration of the present embodiment includes two blind spot side step pairs, that is, the pair including the blind spot side step 31 and the blind spot side step 32 and the pair including the blind spot side step 32 and the blind spot side step 33. These two blind spot side step pairs are the same as part of the blind spot side step pairs described in the third embodiment. Accordingly, effects similar to the effects of the first embodiment can be achieved. When the number of display side step pairs is set to be equal to the number of blind spot side step pairs, unevenness in brightness is reduced and the light utilization efficiency is improved, compared with a case where the number of display side step pairs is set to be different from the number of blind spot side step pairs.

Figure 17:
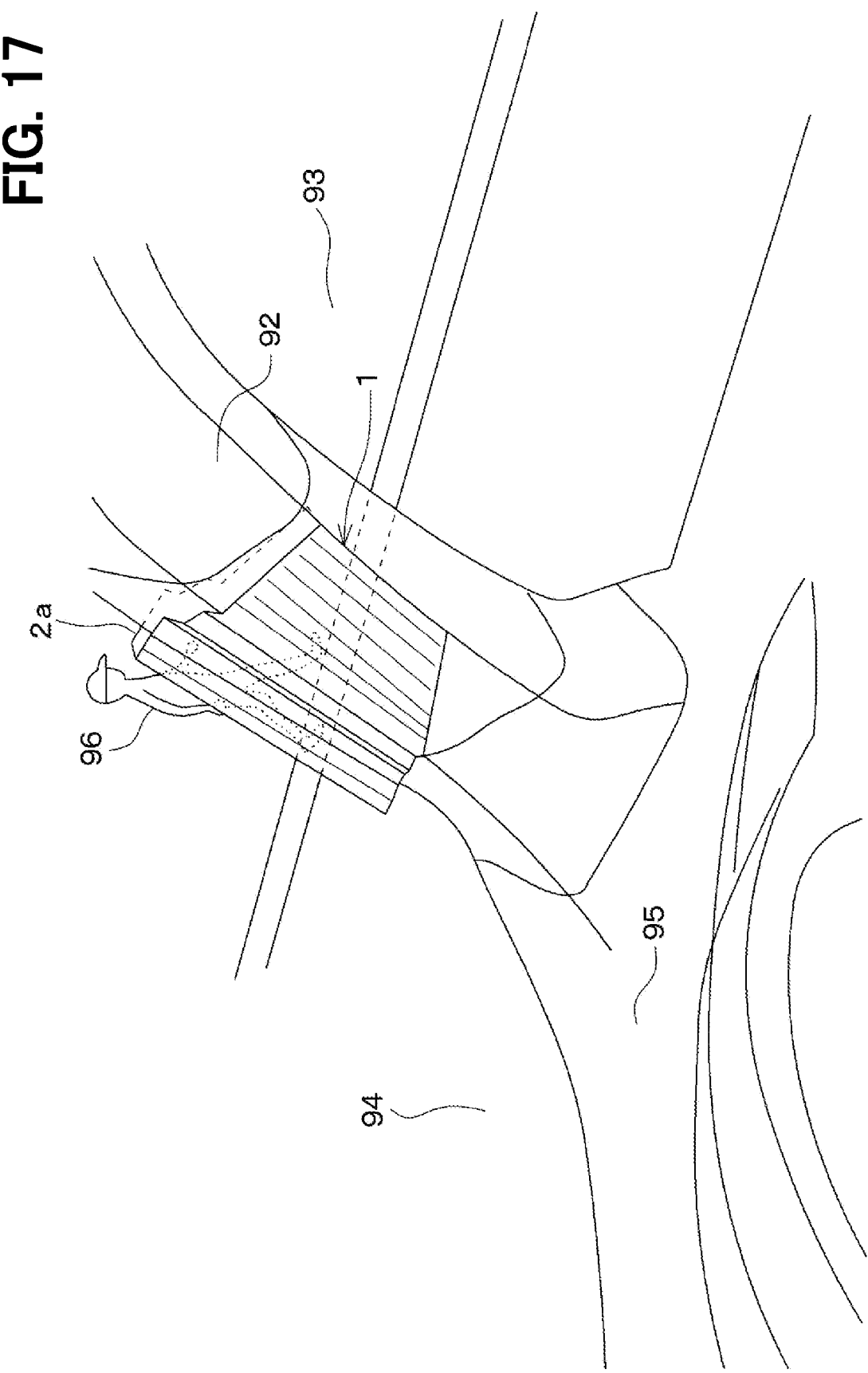
FIG. 17 is a diagram showing a view in a direction toward a front pillar of a vehicle with a drivers seat as an eye point.

FIG. 17 shows a state in which the blind spot display device 1 according to the present embodiment is attached to the front pillar 92 of the vehicle. In this state, the incidence surface 2a is arranged toward the blind spot area that is blocked by the front pillar 92.

In the present embodiment, the configuration of the blind spot display device 1, which is not described, may be configured the same as corresponding configuration of the blind spot display device 1 according to the first embodiment to the third embodiment. In the present embodiment, the same effect as the first embodiment to the third embodiment can be obtained by the same configuration as the first embodiment to the third embodiment.

Other Embodiments

The present disclosure is not limited to the embodiments described above, and may be appropriately modified. The embodiments described above are not independent of each other, and can be appropriately combined except when the combination is obviously impossible. The constituent element(s) of each of the above embodiments is/are not necessarily essential unless it is specifically stated that the constituent element(s) is/are essential in the above embodiments, or unless the constituent element(s) is/are obviously essential in principle. A quantity, a value, an amount, a range, or the like referred to in the description of the above embodiments is not necessarily limited to the described specific value, amount, range or the like unless it is specifically described as essential or understood as being essential in principle. When multiple values are exemplified for a certain parameter, it is also possible to adopt a value between the multiple values unless an exception statement is made or when it is clearly impossible in principle. A shape, positional relationship or the like of a structural element, which is referred to in the embodiments described above, is not limited to the described shape, positional relationship or the like, unless it is specifically described or obviously necessary to be limited in principle. The present disclosure also includes the following modifications made based on the above embodiments, and includes modifications within a range of equivalency of the above embodiments. The following modifications can be independently selected to be applied or not applied to the above-described embodiments. That is, the following modifications may be properly combined with one another, and may be applied to the above embodiments.

(First Modification)

In each of the above-described embodiments, the display side reflecting surface 3 of the exit surface 2b has multiple flat portions 3a and multiple prism portions 4 alternately arranged from one another. Specifically, each flat portion 3a is sandwiched by two prism portions 4, and each prism portion 4 is sandwiched by two flat portions. Each of the multiple flat portions 3a is separated from one another, and each of the multiple prism portions 4 is separated from one another. By the multiple flat portions 3a, the external environment light beam can be totally reflected toward the blind spot side reflecting surface 2c. This configuration may be modified as follows. For example, a reflecting portion that totally reflects the external environment light beam toward the blind spot side reflecting surface 2c may be not arranged between the prism portions 4. Alternatively, the reflecting portion that totally reflects the external environment light beam may be arranged at a position between the prism portion 4 and the blind spot side reflecting surface 2c.

(Second Modification)

In each of the above-described embodiments, the exit surface 2b has multiple display side steps, and the protrusion levels of the flat portions 3a toward the display side in one display side step are different from the protrusion levels of the flat portions 3a toward the display side in another display side step. This configuration may be modified as follows. For example, the protrusion levels of the flat portions 3a toward the display side in each display side step may be the same as one another. In this configuration, by setting the protruding levels of the multiple prism portions 4 toward the display side to be different from one another, an end surface of the apexes of the multiple prism portions 4 may be arranged in a three-dimensional manner not along a plane.

(Third Modification)

The flat portion 3a has a flat shape in the above embodiments. In another example, the flat portion may have a shape rather than the flat shape. In some embodiments, the blind spot side 2c is smoothly shaped. Alternatively, the blind spot side reflecting surface 2c does not necessarily have to be smooth.

(Fourth Modification)

The blind spot display device 1 of the present disclosure is attached to the front pillar 92 of the vehicle. A target object to which the blind spot display device 1 is attached may be another object other than the front pillar 92 of the vehicle. For example, the blind spot display device 1 may be attached to a center pillar of the vehicle positioned at a center portion in a front to rear direction of the vehicle. Alternatively, the blind spot display device 1 may be attached to a place other than the vehicle. For example, the blind spot display device 1 may provide similar effects when the blind spot display device 1 is attached to a door of a building.

What is claimed is:

1. A blind spot display device displaying an image of a blind spot blocked by an obstacle, the blind spot display device comprising:
    an incidence surface through which external environment light beams enter, the external environment light beams being transmitted from the blind spot;
    a light guide member guiding the external environment light beams entered through the incidence surface;
    a first reflecting surface arranged opposite to the blind spot with respect to the light guide member, the external environment light beams guided by the light guide member being reflected on the first reflecting surface;
    a second reflecting surface arranged close to the blind spot with respect to the light guide member, the second reflecting surface being opposed to the first reflecting surface, the external environment light beams guided by the light guide member being reflected on the second reflecting surface; and
    a plurality of prism portions arranged opposite to the blind spot with respect to the light guide member and protruding toward a display region, the display region being defined as a region opposite to the blind spot with respect to the light guide member, the external environment light beams emitting toward the display region through the plurality of prism portions after traveling through the light guide member, wherein the external environment light beams enter the light guide member through the incidence surface, and then reflect alternately on the first reflecting surface and the second reflecting surface while traveling in an arranging direction of the plurality of prism portions distant from the incidence surface, a part of the external environment light beams emit toward the display region through the plurality of prism portions, and apexes of the plurality of prism portions are arranged in a three dimensional manner not along a plane.

2. The blind spot display device according to claim 1, wherein the first reflecting surface includes a plurality of sub surfaces separated from one another and the plurality of sub surfaces are alternately arranged with the plurality of prism portions, each of the plurality of prism portions protrudes toward the display region more than adjacent two of the plurality of sub surfaces, and the first reflecting surface is arranged in a three dimensional manner not along a plane.

3. The blind spot display device according to claim 2, wherein the plurality of prism portions and the first reflecting surface, as a whole, has a stepped shape and the stepped shape includes a plurality of first steps, the plurality of first steps include a certain first step and a subsequent first step arranged adjacent to the certain first step in a direction distant from the incidence surface, the subsequent first step protrudes toward the display region more than the certain first step, the certain first step is connected with the subsequent first step by an inclined surface, one of the external environment light beams passes through one of the plurality of prism portions, which is included in the certain first step and is arranged closest to the subsequent first step, toward the display region, and the inclined surface is arranged such that the one of the external environment light beams is not blocked by the inclined surface.

4. The blind spot display device according to claim 3, wherein the plurality of prism portions include a certain prism portion arranged on the certain first step and the certain prism portion has a surface arranged close to the incidence surface, and the inclined surface connecting the certain first step and the subsequent first step is parallel to the surface of the certain prism portion, which is arranged close to the incidence surface.

5. The blind spot display device according to claim 2, wherein the plurality of prism portions and the first reflecting surface, as a whole, has a stepped shape and the stepped shape includes a plurality of first steps, the plurality of first steps include a certain first step and a subsequent first step arranged adjacent to the certain first step in a direction distant from the incidence surface, the subsequent first step protrudes toward the display region more than the certain first step, the certain first step is connected with the subsequent first step by an inclined surface, the plurality of prism portions include a certain prism portion arranged on the certain first step, one of the external environment light beams passes through the certain prism portion toward the display region and then enters the inclined surface, and the inclined surface is inclined such that an incidence angle of the one of the external environment light beams with respect to the inclined surface is equal to an incidence angle ($\theta1+\psi$) of the one of the external environment light beams with respect to the incidence surface.

6. The blind spot display device according to claim 5, wherein the inclined surface is parallel to the incidence surface.

7. The blind spot display device according to claim 2, wherein the plurality of prism portions and the first reflecting surface, as a whole, has a stepped shape and the stepped shape includes a plurality of first steps, the plurality of first steps include a certain first step and a precedent first step arranged adjacent to the certain first step in a direction forwarding the incidence surface, the precedent first step protrudes toward the display region more than the certain first step, the external environment light beams enter the incidence surface parallel to a cross section of the blind spot display device, which includes the incidence surface, the light guide member, the first reflecting surface, the second reflecting surface, and the plurality of prism portions, a distance (h) defined in a protruding direction between a portion of the first reflecting surface, which is arranged in the precedent first step and closest to the certain first step, and another portion of the first reflecting surface, which is arranged in the certain first step and closes to the precedent first step, satisfies a relationship expression described below, the protruding direction is defined as a direction in which the certain first step or the precedent first step protrudes toward the display region, an inclination angle ($\psi$) of an inclined surface, which connects the certain first step and the precedent first step, with respect to the protruding direction is an acute angle, and satisfies the relationship expression described below, a light guide angle ($\phi$) of the external environment light beams is defined with respect to the protruding direction when the external environment light beams reflect on the first reflecting surface after passing through the light guide member, and the light guide angle satisfies the relationship expression described below, one of the plurality of prism portions included in the precedent first step is arranged closest to the certain first step, and a width (Wse) of the one of the plurality of prism portions is defined in a direction perpendicular to the protruding direction and the width satisfies the relationship expression described below, the relation expression is h≤Wse/{tan φ×(1−tan ψ×tan φ)}.

8. The blind spot display device according to claim 7, wherein
the second reflecting surface has a stepped shape and the stepped shape includes a plurality of second steps, and
the second reflecting surface is arranged in a three dimensional manner not along a plane.

9. The blind spot display device according to claim 8, further comprising
a plurality of connection surfaces each of which connects adjacent two of the plurality of second steps,
wherein
in a direction distant from the incidence surface, the plurality of connection surfaces are arranged farther than the inclined surface, which connects one of the plurality of first steps closest to the incidence surface and another one of the plurality of first steps secondly closest to the incidence surface.

10. The blind spot display device according to claim 8, wherein
a part of the plurality of first steps are arranged such that one of the plurality of first steps far from the incidence surface protrudes toward the display region more than an adjacent one of the plurality of first steps close to the incidence surface,
the part of the plurality of first steps are divided into one or more first step pairs each of which including adjacent two of the plurality of first steps,
a part of the plurality of second steps are arranged such that one of the plurality of second steps far from the incidence surface is arranged closer to the display region compared with an adjacent one of the plurality of second steps close to the incidence surface,
the part of the plurality of second steps are divided into one or more second step pairs each of which including adjacent two of the plurality of second steps, and
a quantity of the one or more first step pairs is equal to a quantity of the one or more second step pairs.

* * * * *